(12) United States Patent
Murakami et al.

(10) Patent No.: US 9,768,616 B2
(45) Date of Patent: Sep. 19, 2017

(54) RESONANCE SUPPRESSION DEVICE

(71) Applicant: FUJI ELECTRIC CO., LTD., Kawasaki-shi, Kanagawa (JP)

(72) Inventors: Kenya Murakami, Kawasaki (JP); Toru Jintsugawa, Kawasaki (JP); Tomohiro Koike, Kawasaki (JP); Kentaro Kofuji, Kawasaki (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 0 days.

(21) Appl. No.: 15/447,996

(22) Filed: Mar. 2, 2017

(65) Prior Publication Data

US 2017/0179718 A1     Jun. 22, 2017

Related U.S. Application Data

(63) Continuation of application No. 14/775,064, filed as application No. PCT/JP2014/061166 on Apr. 21, 2014, now Pat. No. 9,621,023.

(30) Foreign Application Priority Data

Apr. 26, 2013   (WO) .................. PCT/JP2013/062386

(51) Int. Cl.
*H02J 1/10*       (2006.01)
*H02J 3/01*       (2006.01)
(Continued)

(52) U.S. Cl.
CPC ................ *H02J 3/01* (2013.01); *H02J 3/386* (2013.01); *H02M 1/12* (2013.01); *H02M 7/44* (2013.01)

(58) Field of Classification Search
CPC .. H02J 3/01; H02J 3/386; H02M 1/12; H02M 7/44
See application file for complete search history.

(56) References Cited

U.S. PATENT DOCUMENTS 5,047,909 A   9/1991   Hosoda
5,077,517 A   12/1991  Tanoue et al.
(Continued)

FOREIGN PATENT DOCUMENTS

CN   102868309 A   1/2013
JP   8-80052 A     3/1996
(Continued)

OTHER PUBLICATIONS

International Search Report dated Jul. 8, 2014, issued in counterpart Application nN. PCT/JP2014/061166 (1 page).
(Continued)

*Primary Examiner* — Daniel Cavallari
(74) *Attorney, Agent, or Firm* — Westerman, Hattori, Daniels & Adrian, LLP

(57) ABSTRACT

A resonance suppression device configured to supply compensation current to a power system from a power conversion device connected to the power system, to suppress resonance which occurs with a power facility being connected to the power system, the resonance suppression device includes: a transfer function that is to be multiplied to a value based on voltage of the power system; a filter configured to extract a frequency component obtained by eliminating a fundamental wave component from frequency components contained in the inputted voltage, to output the resultant; and a coefficient control unit configured to control a coefficient of the transfer function so that a value of the compensation current falls within a predetermined range, according to output capacity of the power conversion device, wherein including a current command value generation unit being configured to generate as a current command value with respect to the power conversion device an output value obtained by inputting in the filter a value obtained by multiplying the transfer function to voltage of the power (Continued)

system or a value obtained by multiplying the transfer function to an output value obtained by inputting in the filter voltage of the power system, wherein the current command value generation unit outputs the current command value to the power conversion device, to supply the compensation current to the power system.

6 Claims, 29 Drawing Sheets

(51) Int. Cl.
    H02J 3/38     (2006.01)
    H02M 1/12    (2006.01)
    H02M 7/44    (2006.01)

(56)  References Cited

U.S. PATENT DOCUMENTS

| | | | |
|---|---|---|---|
| 5,397,927 | A | 3/1995 | Suelzle et al. |
| 5,608,276 | A | 3/1997 | Suelzle |
| 6,756,702 | B1 | 6/2004 | Kalman et al. |
| 2008/0106099 | A1 | 5/2008 | Ichinose et al. |
| 2008/0219035 | A1 | 9/2008 | Wu et al. |
| 2009/0168474 | A1 | 7/2009 | Katoh et al. |
| 2010/0237821 | A1 | 9/2010 | Kitanaka |
| 2011/0279071 | A1 | 11/2011 | Yamada |
| 2012/0262957 | A1 | 10/2012 | Yamada et al. |
| 2013/0033907 | A1 | 2/2013 | Zhou et al. |
| 2013/0135907 | A1 | 5/2013 | Oi et al. |
| 2013/0214536 | A1 | 8/2013 | Wakasa et al. |
| 2013/0285591 | A1 | 10/2013 | Suzuki |
| 2013/0328398 | A1 | 12/2013 | Kanao et al. |
| 2013/0336025 | A1 | 12/2013 | Figueroa et al. |
| 2014/0049197 | A1 | 2/2014 | Kitanaka |
| 2014/0152331 | A1 | 6/2014 | Wagoner et al. |
| 2014/0268970 | A1 | 9/2014 | Tanaka et al. |
| 2014/0340005 | A1 | 11/2014 | Sakai et al. |
| 2015/0137779 | A1 | 5/2015 | Takase et al. |
| 2015/0280612 | A1 | 10/2015 | Ide et al. |
| 2015/0323232 | A1 | 11/2015 | Kawashima |
| 2016/0070241 | A1 | 3/2016 | Kawashima |
| 2016/0226425 | A1 | 8/2016 | Kawashima |

FOREIGN PATENT DOCUMENTS

| | | |
|---|---|---|
| JP | 9-93813 A | 4/1997 |
| JP | 11-32435 A | 2/1999 |
| JP | 2003-174725 A | 6/2003 |
| JP | 2012-55148 A | 3/2012 |
| JP | 2012-143076 A | 7/2012 |
| JP | 2013-162650 A | 8/2013 |
| JP | 20013-162650 A | 8/2013 |

OTHER PUBLICATIONS

Supplementary European Search Report dated Sep. 15, 2016, issued in European Application No. EP 14788421 (6 pages).
Office Action dated Oct. 25, 2016, issued in counterpart Japanese Application No. 2015/513745 with English translation (6 pages).
Office Action dated Apr. 27, 2017, issued in counterpart Chinese Application No. 201480014269.3, with English translation (19 pages).

RESONANCE SUPPRESSION DEVICE

CROSS-REFERENCE TO RELATED APPLICATIONS

This is a continuation application of U.S. application Ser. No. 14/775,064 which is National Stage Entry of International Patent Application No. PCT/JP2014/061166 filed Apr. 21, 2014, which claims the benefit of priority to PCT/JP2013/062386 filed Apr. 26, 2013, of which full contents are incorporated herein by reference.

BACKGROUND OF THE INVENTION

The present invention relates to a resonance suppression device.

DESCRIPTION OF THE RELATED ART

Recently, renewable energy has been spread and large-scale wind farms (wind farm: collective wind power plant) each provided with many wind power generators have been constructed. Note that Patent Literature 1 (Japanese Patent Application Laid-open Publication No. Hei8-80052), Patent Literature 2 (Japanese Patent Application Laid-open Publication No. Hei11-32435), and Patent Literature 3 (Japanese Patent Application Laid-open Publication No. 2003-174725) are known as related art.

Such a wind power generator has recently become mainstream that includes an (AC-DC) converter which converts generated power into direct current and a (DC-AC) inverter which converts the direct current into alternate current, and further includes a harmonic filter which eliminates harmonic current caused by an inverter. However, when the wind power generator including a harmonic filter is connected (interconnected) to a power system, resonance occurs due to capacitance of a harmonic filter and inductance (inductance coefficient) of the power system and a transformer, which may cause distortion of voltage in a wind farm.

Thus, for example, FIG. 2 of Patent Literature 1 discloses a power active filter that controls a power conversion device so as to extract a harmonic component contained in load current using a highpass filter (HPF), to cancel out the harmonic component. Further, for example, Patent Literature 2 discloses a power conversion device that corrects a current command value with a current correction value obtained by multiplying, by a predetermined transfer function, a harmonic component contained in current flowing from an alternating-current power supply to a capacitor and voltage generated thereby, to suppress harmonic current.

Here, FIG. 14 illustrates an example of a state where power equipment such as a wind power generator is connected to a power system and resonance occurs and resonance frequency components are superimposed on connection point voltage V and output current i1 of power equipment (supply current to power system). Further, FIG. 15 illustrates an example of voltage/current frequency characteristics in such a case. Note that, in voltage/current frequency characteristics illustrated in FIG. 15, the size of a fundamental wave (first order) component is given as 1. In this example, an eleventh harmonic component (eleventh harmonic voltage), which is relatively large, is superimposed on voltage, and this causes large harmonic distortion in the connection point voltage V. Further, odd-order harmonic components (odd-order harmonic current), which are moderate, are superimposed on current.

Whereas, when a power active filter of FIG. 2 in Patent Literature 1 is used, all the harmonic components are suppressed, and thus the waveform of the connection point voltage V results in a substantially complete sine wave, for example, as illustrated in FIGS. 16 and 17. Note that, in FIG. 16, i represents the output current (compensation current) of an inverter included in the power active filter, i2 (=i1+i) represents supply current to a power system. However, in such a power active filter, even if the harmonic distortion of the connection point voltage V, which is caused by the eleventh harmonic voltage, is intended to be reduced, all the harmonic components are reduced as illustrated in FIG. 17. Thus, large compensation current i is needed, which requires an inverter having a large capacity.

On the other hand, in the power conversion device in Patent Literature 2, a transfer function that is used to calculate a current correction value is set in advance based on the capacity of capacitor and the impedance characteristic of the power conversion device when seen from the alternating-current power supply. However, since there are many cases where the accurate values thereof cannot be obtained, it is difficult to appropriately set the transfer function and achieve a sufficient resonance suppression effect. Further, even if the transfer function is appropriately set, when the configuration of the power system changes, the resonance point (resonance frequency) changes, and resonance may occur again.

Further, even if the configuration of the power system does not change, in a wind power plant provided with a plurality of wind power generators, the capacitance of a harmonic filter changes according to the number of connected wind power generators, and the resonance point also changes. That is, capacitances of harmonic filters provided in the wind power generators are connected in parallel, for example, as illustrated in FIG. 18, and thus, as the number of connected wind power generators increases, a resonance frequency is reduced. Therefore, in a wind power plant in which the number of wind power generators connected to a power system changes, it is difficult to use the method of suppressing resonance as in the power conversion device of Patent Literature 2.

Further, for example, when subharmonics lower than the frequency of the fundamental wave is generated in the connection point voltage V as well, it may be difficult to suppress resonance using relatively small compensation current, similarly to the case where a harmonic is generated in the connection point voltage V.

SUMMARY OF THE INVENTION

A resonance suppression device according to an aspect of the present invention, configured to supply compensation current to a power system from a power conversion device connected to the power system, to suppress resonance which occurs with a power facility being connected to the power system, the resonance suppression device including:

a transfer function that is to be multiplied to a value based on voltage of the power system;

a filter configured to extract a frequency component obtained by eliminating a fundamental wave component from frequency components contained in the inputted voltage, to output the resultant; and a coefficient control unit configured to control a coefficient of the transfer function so that a value of the compensation current falls within a predetermined range, according to output capacity of the power conversion device, wherein including a current command value generation unit being configured to generate as a current command value with respect to the power conversion device an output value obtained by inputting in the filter a value obtained by multiplying the transfer function to voltage of the power system or a value obtained by multiplying the transfer function to an output value obtained by inputting in the filter voltage of the power system, wherein the current command value generation unit outputs the current command value to the power conversion device, to supply the compensation current to the power system.

Other features of the present invention will become apparent from descriptions of the present specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of the present specification and of the accompanying drawings.

First Embodiment

===Configuration of Resonance Suppression Device===

A configuration of a resonance suppression device according to a first embodiment of the present invention will hereinafter be described with reference to FIGS. 1 to 3.

Figure 1:
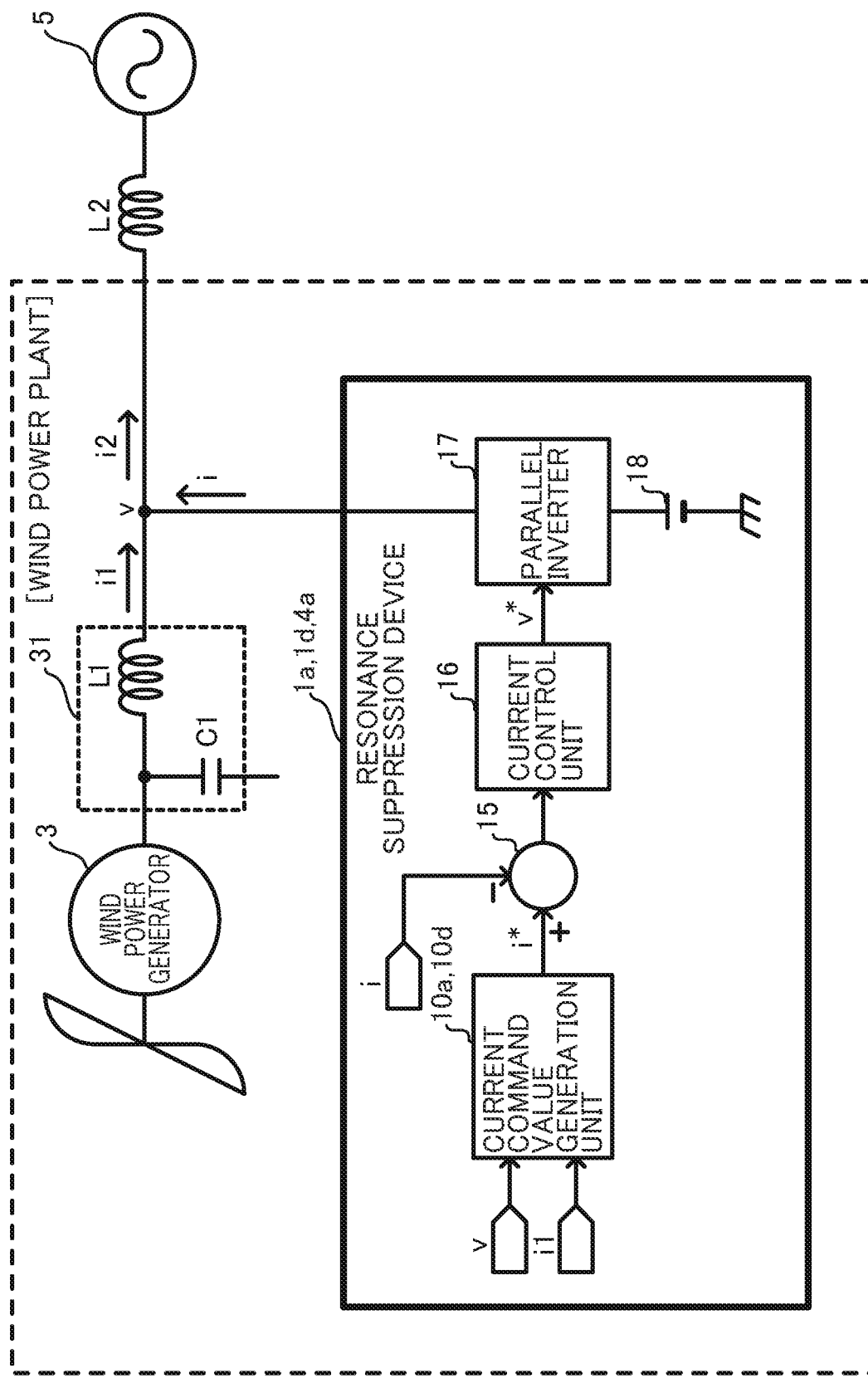
FIG. 1 is a block diagram illustrating a configuration of a resonance suppression device according to first, fifth and eighth embodiments according to the present invention.

A resonance suppression device 1a illustrated in FIG. 1 is a device provided, for example, in a wind power plant, to reduce resonance which occurs with a wind power generator 3 (an example of a power facility) including a harmonic filter 31 being connected to a power system 5. Further, the resonance suppression device 1a includes: a current command value generation unit 10a; an addition unit 15; a current control unit 16; a parallel inverter 17; and a direct current power supply 18. Note that, for example, the resonance suppression device 1a may include those other than the parallel inverter 17 and the direct current power supply 18 in the above components.

In FIG. 1, the wind power generator 3 represents one or a plurality of wind power generators that are connected to the power system 5. Further, in FIG. 1, capacitance of a harmonic filter included in each of one or a plurality of wind power generators connected to the power system 5 is illustrated as a synthetic capacitance C1, and inductance of a transformer that connects each of the wind power generators to the power system 5 is illustrated as synthetic inductance L1. Further, L2 represents inductance of the power system 5.

Voltage V (voltage of the power system) at a connection point between the wind power generator 3 and the power system 5 and output current i1 of the wind power generator 3 are inputted to the current command value generation unit 10a. Note that the voltage V at the connection point is assumed to include: voltage at the connection point between the wind power generator 3 and the power system 5; and voltage in the vicinity of the connection point between the wind power generator 3 and the power system 5. A current command value i* with respect to output current (compensation current) i of the parallel inverter 17 is outputted from the current command value generation unit 10a. Further, the compensation current i and the current command value i* corresponding thereto are inputted to the addition unit 15. A difference (i*−i) between the current command value i* and the compensation current i is inputted from the addition unit 15 to the current control unit 16. Then, a voltage command value V* is outputted from the current control unit 16.

The direct current power supply 18 is connected to the parallel inverter 17. Further, the voltage command value V* is inputted to the parallel inverter 17, and an alternating current (compensation current) i is outputted from the parallel inverter 17. Then, the parallel inverter 17 is connected in parallel to the power system 5 via a transformer (not shown), and the compensation current i outputted from the parallel inverter 17 is supplied to the power system 5 to which the output current i1 of the wind power generator 3 is supplied in parallel therewith. A parallel compensation unit included in a UPFC (Unified Power Flow Controller) may also be used as such a parallel inverter 17 (see, for example, Patent Literature 3).

Figure 2A:
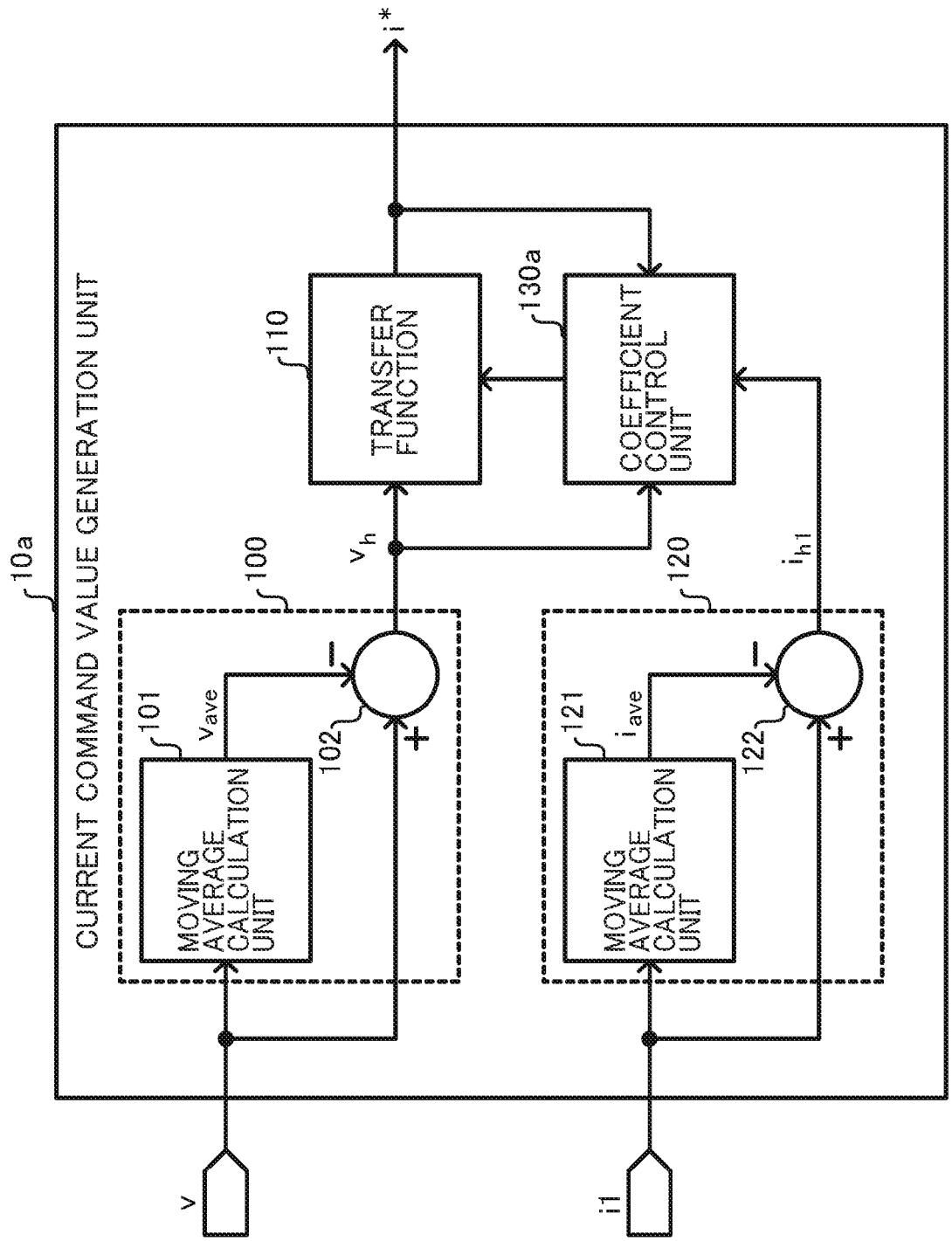
FIG. 2A is a block diagram illustrating a configuration of a current command value generation unit according to the first embodiment of the present invention.
Figure 2B:
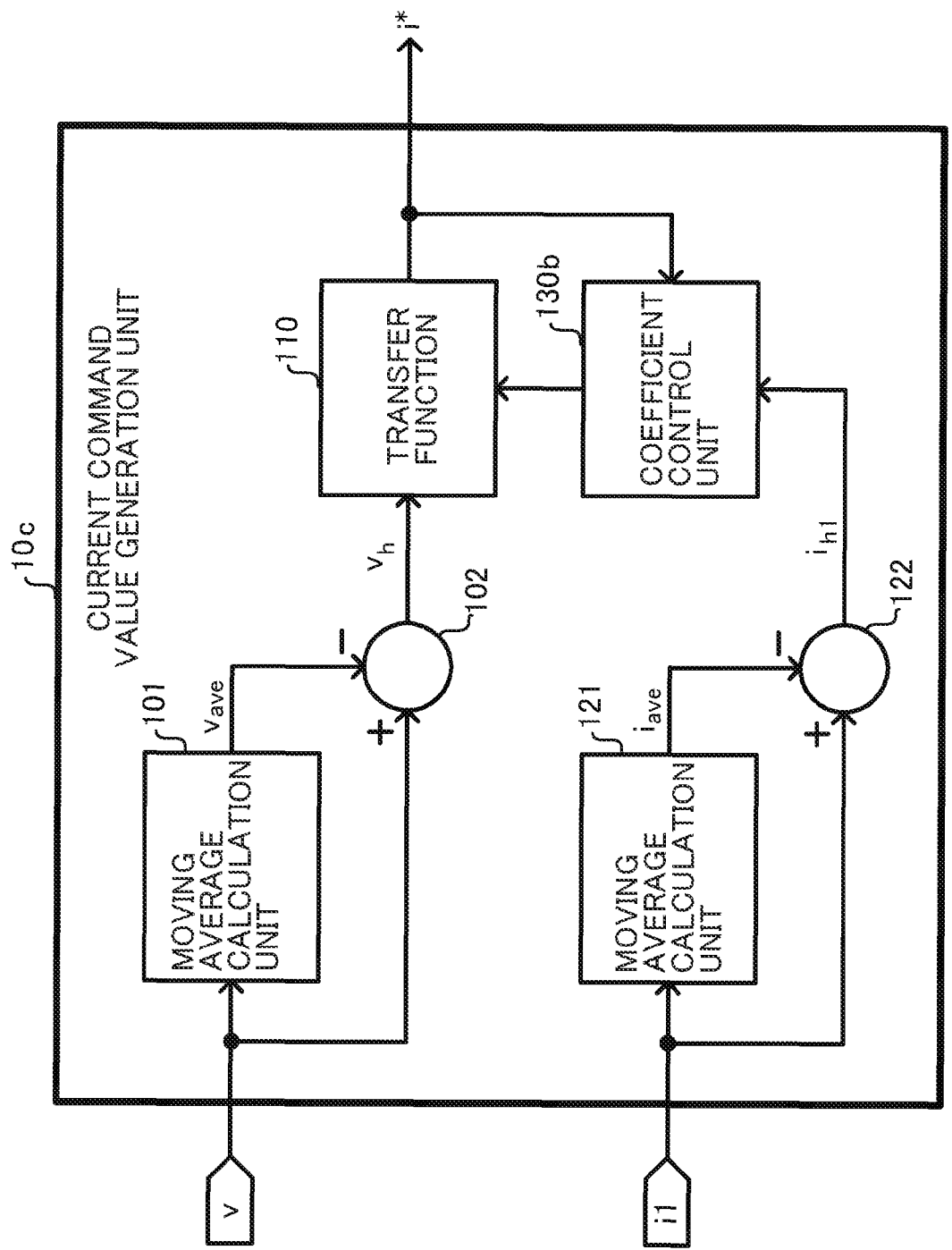
FIG. 2B is a block diagram illustrating another configuration example of a current command value generation unit.

FIG. 2A illustrates a configuration of the current command value generation unit 10a according to the present embodiment. The current command value generation unit 10a illustrated in FIG. 2A includes: moving average calculation units 101, 121; addition units 102, 122; a transfer function 110, and a coefficient control unit 130a.

The connection point voltage V is inputted to the moving average calculation unit 101. A fundamental wave component (fundamental wave voltage) $V_{aVe}$ of the connection point voltage V is outputted from the moving average calculation unit 101. Further, the connection point voltage V and the fundamental wave voltage $V_{aVe}$ are inputted to the addition unit 102. A difference between the connection point voltage V and the fundamental wave voltage $V_{aVe}$, that is, a harmonic component (harmonic voltage) $V_h$ of the connection point voltage V, is outputted from the addition unit 102. Note that a harmonic (harmonics) indicates a wave having a frequency higher than a frequency of a fundamental wave in waves having a predetermined frequency component.

The output current i1 of the wind power generator 3 is inputted to the moving average calculation unit 121. The fundamental wave component (fundamental wave current) $i_{aVe}$ of the output current i1 is outputted from the moving average calculation unit 121. Further, the output current i1 and the fundamental wave current $i_{aVe}$ are inputted to the addition unit 122. A difference between the output current i1 and the fundamental wave current $i_{aVe}$, that is, a harmonic component (harmonic current) $i_{h1}$ of the output current i1 is outputted from the addition unit 122.

The harmonic voltage $V_h$ is inputted to the transfer function 110, the output of the transfer function 110 is outputted from the current command value generation unit 10a as the current command value i*. Further, the harmonic voltage $V_h$, the harmonic current $i_{h1}$, and the current command value i* are inputted to the coefficient control unit 130a, and the coefficient control unit 130a controls a coefficient of the transfer function 110 based on them.

Figure 3:
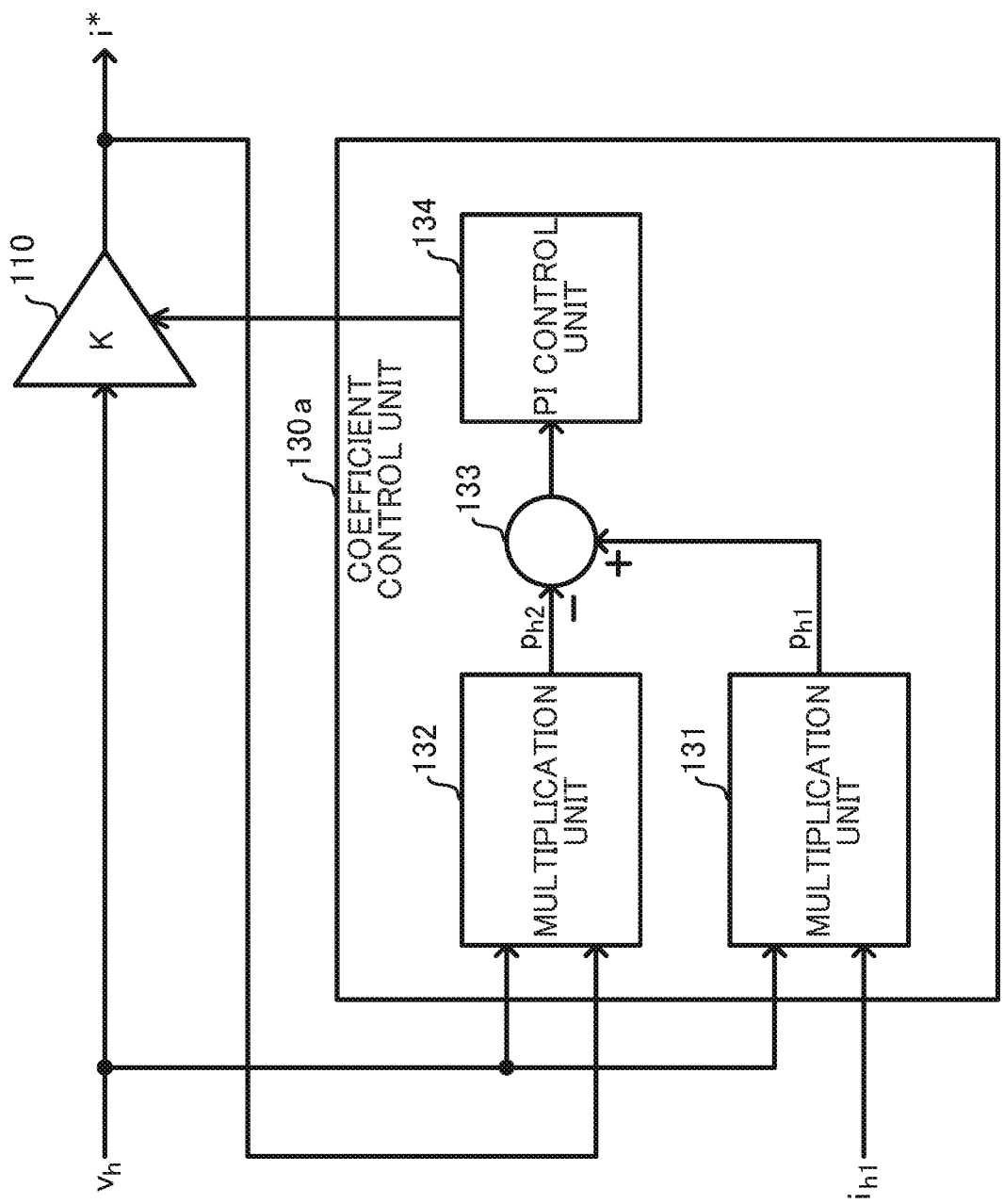
FIG. 3 is a block diagram illustrating a configuration of a coefficient control unit according to the first embodiment of the present invention.

FIG. 3 illustrates a configuration of the coefficient control unit 130a according to the present embodiment. The coefficient control unit 130a illustrated in FIG. 3 includes: the multiplication units 131, 132; an addition unit 133; and a PI (Proportional-Integral) control unit 134.

The harmonic current $i_{h1}$ and the harmonic voltage $V_h$ are inputted to the multiplication unit 131. The product $p_{h1}$ thereof is outputted from the multiplication unit 131. Further, the current command value i* and the harmonic voltage $V_h$ are inputted to the multiplication unit 132. The product $p_{h2}$ thereof is outputted from the multiplication unit 132.

The output value $p_{h1}$ of the multiplication unit 131 and the output value $p_{h2}$ of the multiplication unit 132 are inputted to the addition unit 133. A difference $(p_{h1}-p_{h2})$ between the output value $p_{h1}$ of the multiplication unit 131 and the output value $p_{h2}$ of the multiplication unit 132 is inputted from the addition unit 133 to the PI control unit 134. Further, the PI control unit 134 controls a coefficient of the transfer function 110 based on the output value (ph1−ph2) of the addition unit 133. As an example, the transfer function 110 is configured with only a gain K, and the PI control unit 134 controls the gain K based on the output value (ph1−ph2) of the addition unit 133. Note that a method of controlling the PI control unit 134 is not limited to PI control, but may be I control, for example.

===Operation of Resonance Suppression Device===

Next, an operation of the resonance suppression device according to the present embodiment will be described mainly with reference to FIG. 2A.

The moving average calculation unit 101 calculates a moving average of the connection point voltage V, to extract the fundamental wave component (fundamental wave voltage) $V_{aVe}$ of the connection point voltage V. Further, the addition unit 102 subtracts the fundamental wave voltage $V_{aVe}$ from the connection point voltage V, to extract the harmonic component (harmonic voltage) $V_h$ of the connection point voltage V. Thus, the moving average calculation unit 101 and the addition unit 102 correspond to a first highpass filter (first filter) 100 that extracts a fluctuation component of the connection point voltage V, to extract a harmonic component contained in the connection point voltage V and output the resultant. Then, the current command value generation unit 10a multiplies the output value (harmonic voltage $V_h$) of the highpass filter 100 by the gain K, to output the current command value i*.

The moving average calculation unit 121 calculates a moving average of the output current i1 of the wind power generator 3, to extract the fundamental wave component (fundamental wave current) $i_{aVe}$ of the output current i1. Further, the addition unit 122 subtracts the fundamental wave current $i_{aVe}$ from the output current i1, to extract the harmonic component (harmonic current) $i_{h1}$ of the output current i1. Thus, the moving average calculation unit 121 and the addition unit 122 correspond to a second highpass filter 120 (second filter) that extracts a fluctuation component of the output current i1, to extract a harmonic component contained in the output current i1 and output the resultant.

The coefficient control unit 130a controls a coefficient of the transfer function 110 based on the output values of the highpass filters 100, 120 and the transfer function 110 (harmonic voltage $V_h$, harmonic current $i_{h1}$, and current command value i*). As an example, as illustrated in FIG. 3, the coefficient control unit 130a controls the gain K so as to match the output value of the multiplication unit 132 (the product $p_{h2}$ of the current command value i* and the harmonic voltage $V_h$) with the output value of the multiplication unit 131 (the product $p_{h1}$ of the harmonic current $i_{h1}$ and the harmonic voltage $V_h$).

The current control unit 16 illustrated in FIG. 1 outputs the voltage command value V* corresponding to a difference (i*−i) between the current command value i* and the output current (compensation current) i of the parallel inverter 17. Further, the parallel inverter 17 performs PWM (Pulse Width Modulation) control or PAM (Pulse Amplitude Modulation) control based on the voltage command value V*, to convert power of the direct current power supply 18 into alternate current power, and output the compensation current i. Thereby, the current control unit 16 controls the parallel inverter 17 so that the compensation current i follows the current command value i*, and the parallel inverter 17 supplies, to the power system 5, the compensation current i which follows the current command value i*.

In this manner, the resonance suppression device 1a according to the present embodiment extracts a fluctuation component (harmonic voltage $V_h$) of the connection point voltage V using the highpass filter 100, to supply to the power system 5 the compensation current i which follows the current command value i* that is obtained by multiplying the extracted resultant with the gain K. Thereby, harmonic distortion of the connection point voltage V, which is caused by the harmonic voltage $V_h$, can be reduced.

Furthermore, the current command value generation unit 10a extracts a fluctuation component (harmonic current $i_{h1}$) of the output current i1 of the wind power generator 3 using the highpass filter 120, and controls the gain K based on the resultant. Thereby, even if a resonance point changes, the appropriate gain K corresponding thereto is used to appropriately suppress the harmonic voltage $V_h$ whose frequency characteristics and the like are not identified, thereby being able to suppress resonance.

Here, the coefficient control unit 130a illustrated in FIG. 3 is configured as such a state estimator (observer) that the product of the harmonic voltage $V_h$ and the current command value i* and the product of the harmonic voltage $V_h$ and the harmonic current $i_{h1}$ are obtained and these products are matched with each other. Whereas, the coefficient control unit can be configured as a state estimator that matches the current command value i* with the harmonic current $i_{h1}$, for example, as in a coefficient control unit 130b illustrated in FIG. 4. Note that when the coefficient control unit 130b is used, for example, a current command value generation unit 10c illustrated in FIG. 2B will be employed as a current command value generation unit 10c.

Figure 5:
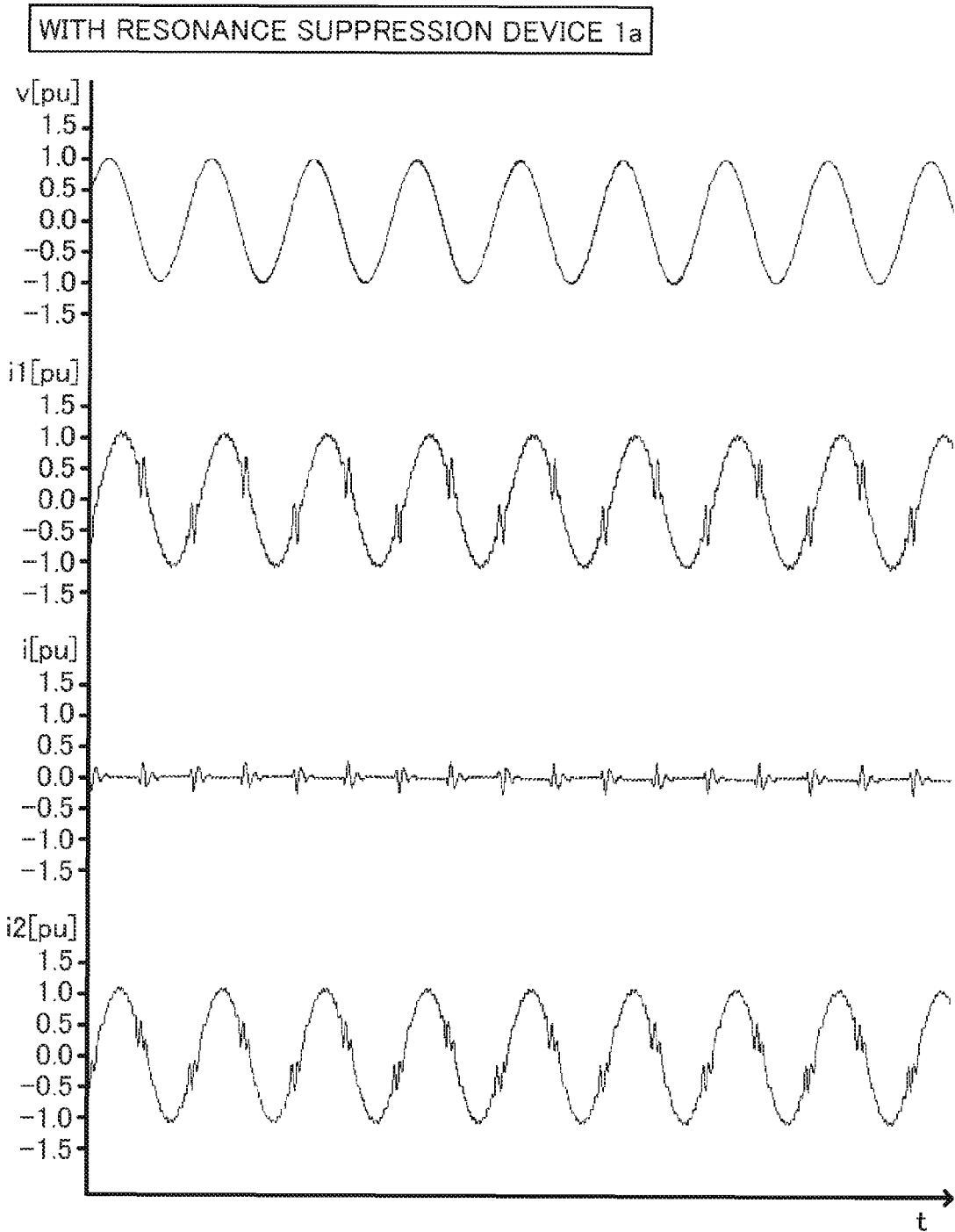
FIG. 5 is a schematic diagram illustrating an example of voltage V and current i, i1, i2 in which resonance is reduced by the resonance suppression device according to the first embodiment of the present invention.
Figure 6:
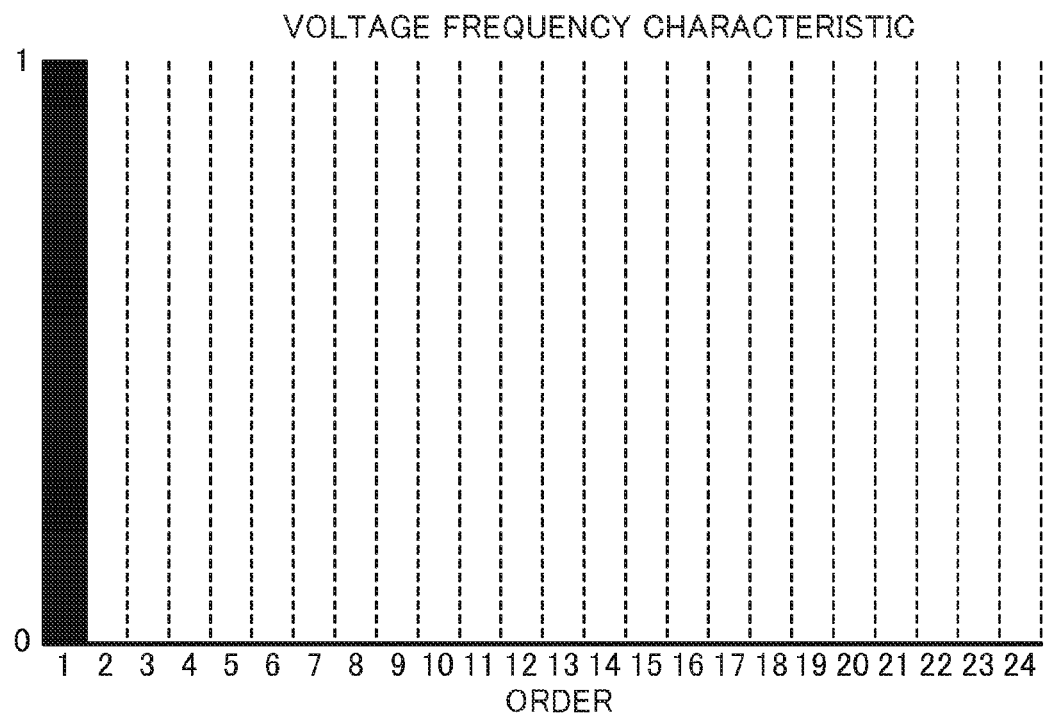
FIG. 6 is a schematic diagram illustrating an example of voltage/current frequency characteristics in which resonance is reduced by the resonance suppression device according to the first embodiment of the present invention.
Figure 6:
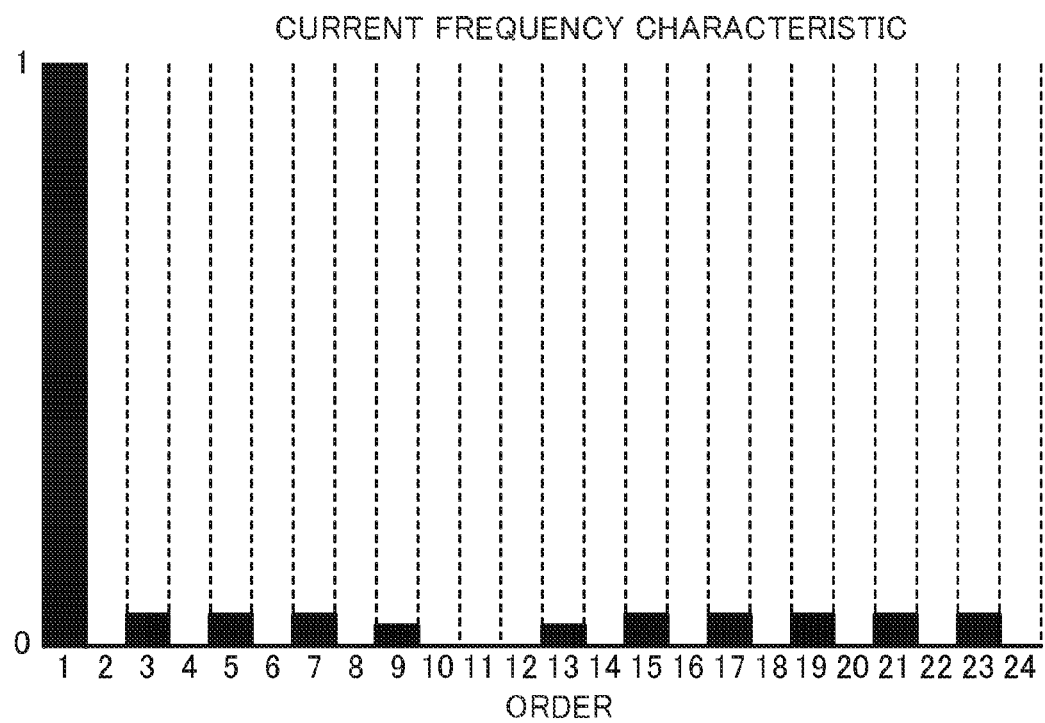
Figure 15:
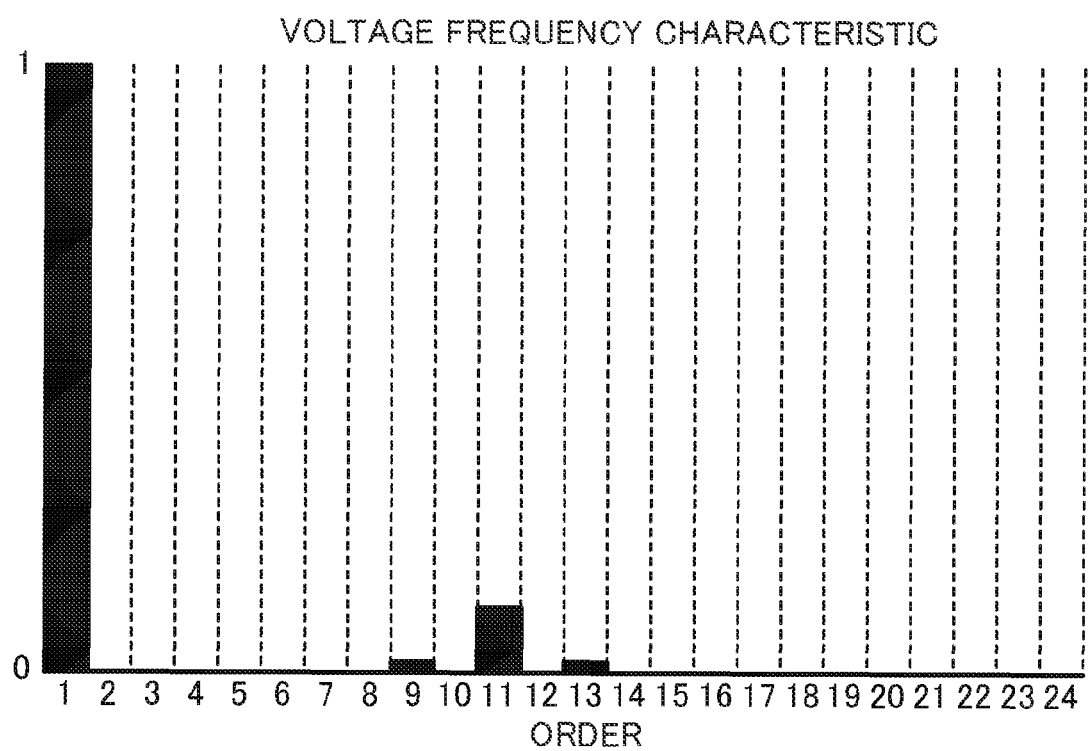
FIG. 15 is a schematic diagram illustrating an example of voltage/current frequency characteristics when resonance is occurring.
Figure 15:
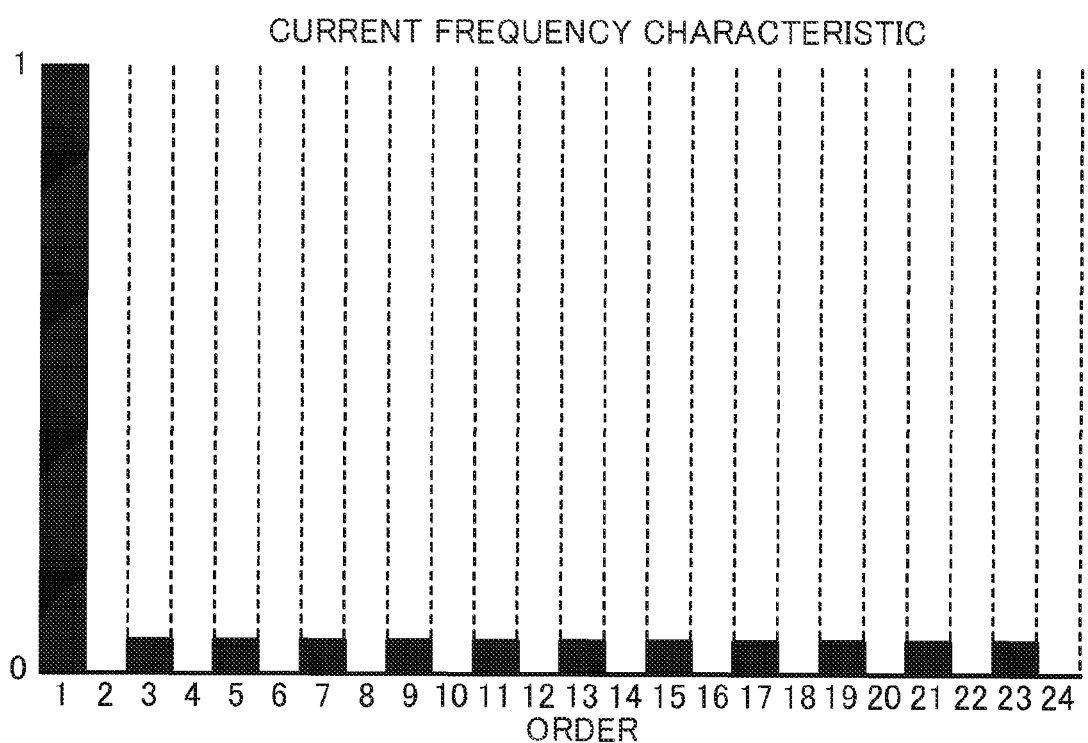
Figure 16:
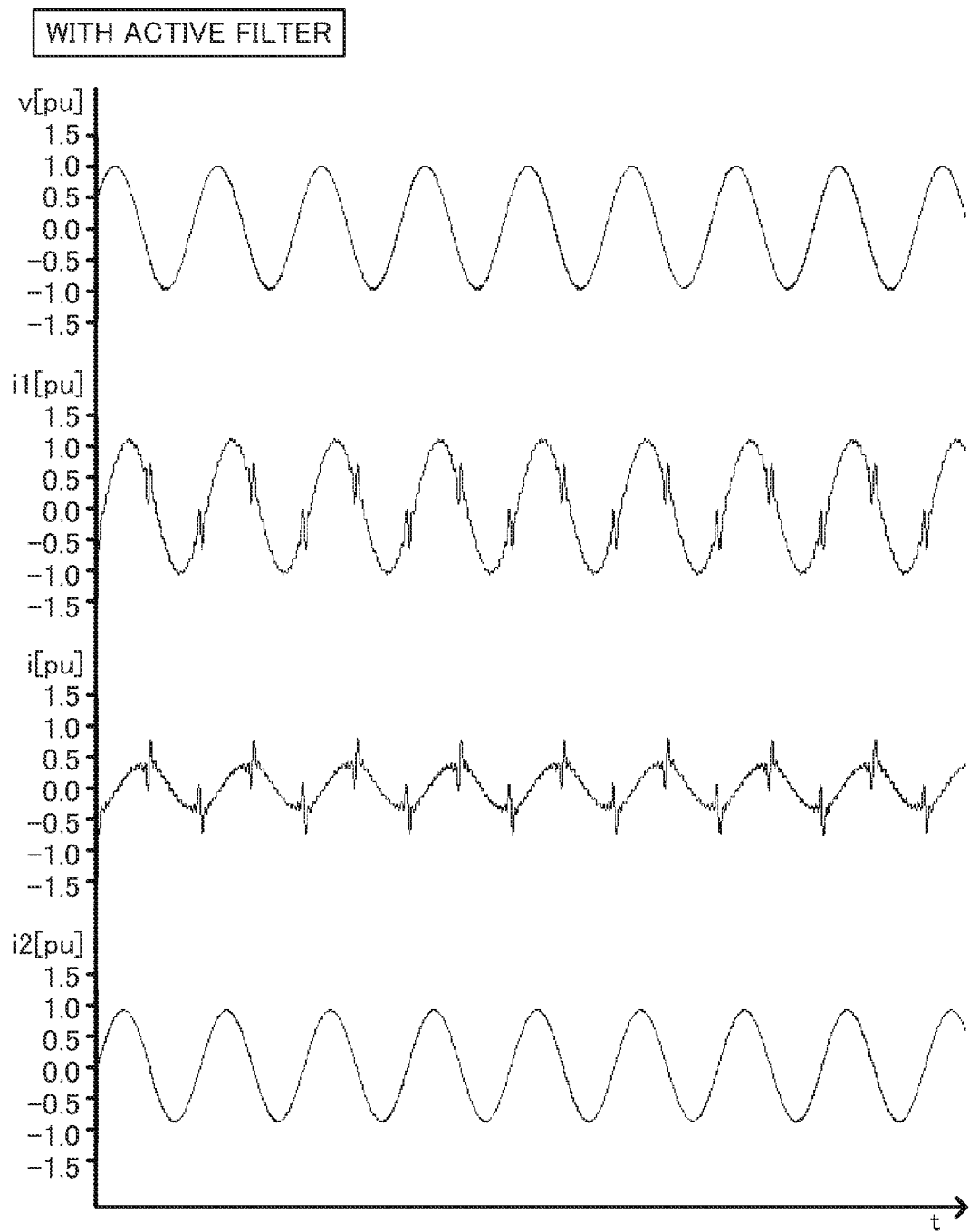
FIG. 16 is a schematic diagram illustrating an example of voltage V and current i, i1, i2 in which resonance is reduced by an active filter active filter.
Figure 17:
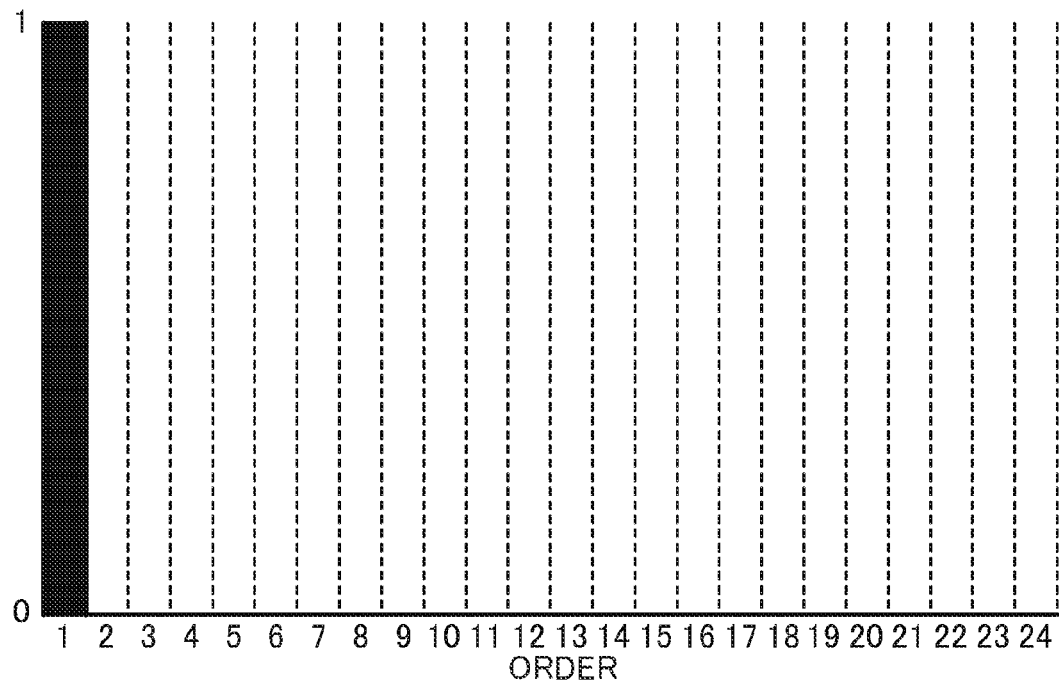
FIG. 17 is a schematic diagram illustrating an example of voltage/current frequency characteristics in which resonance is reduced by an active filter.
Figure 17:
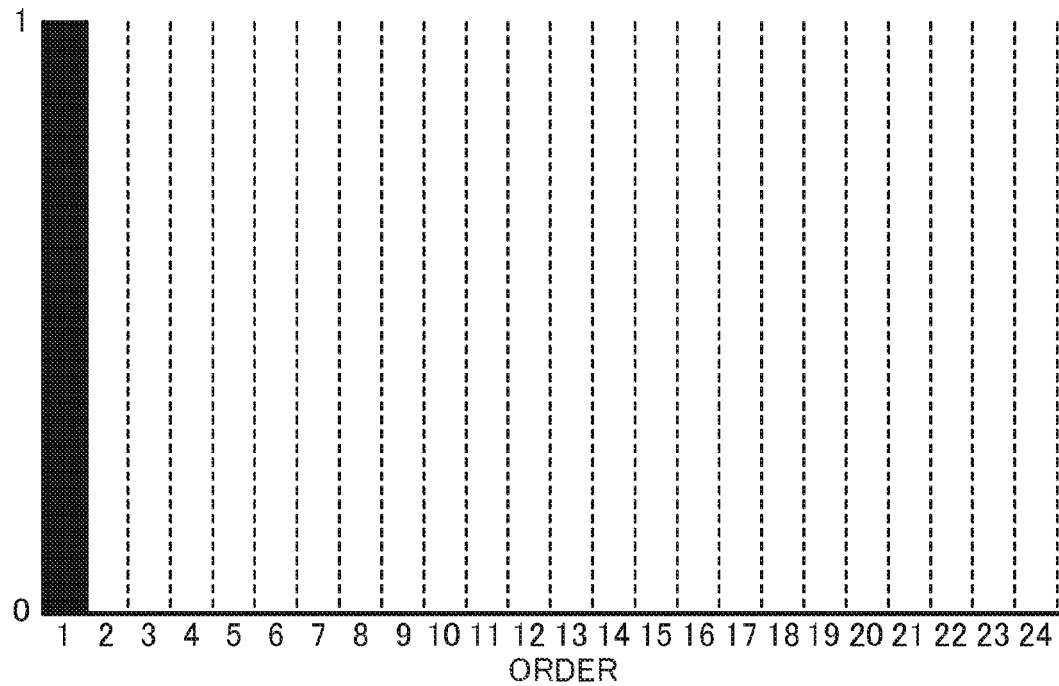
Figure 18:
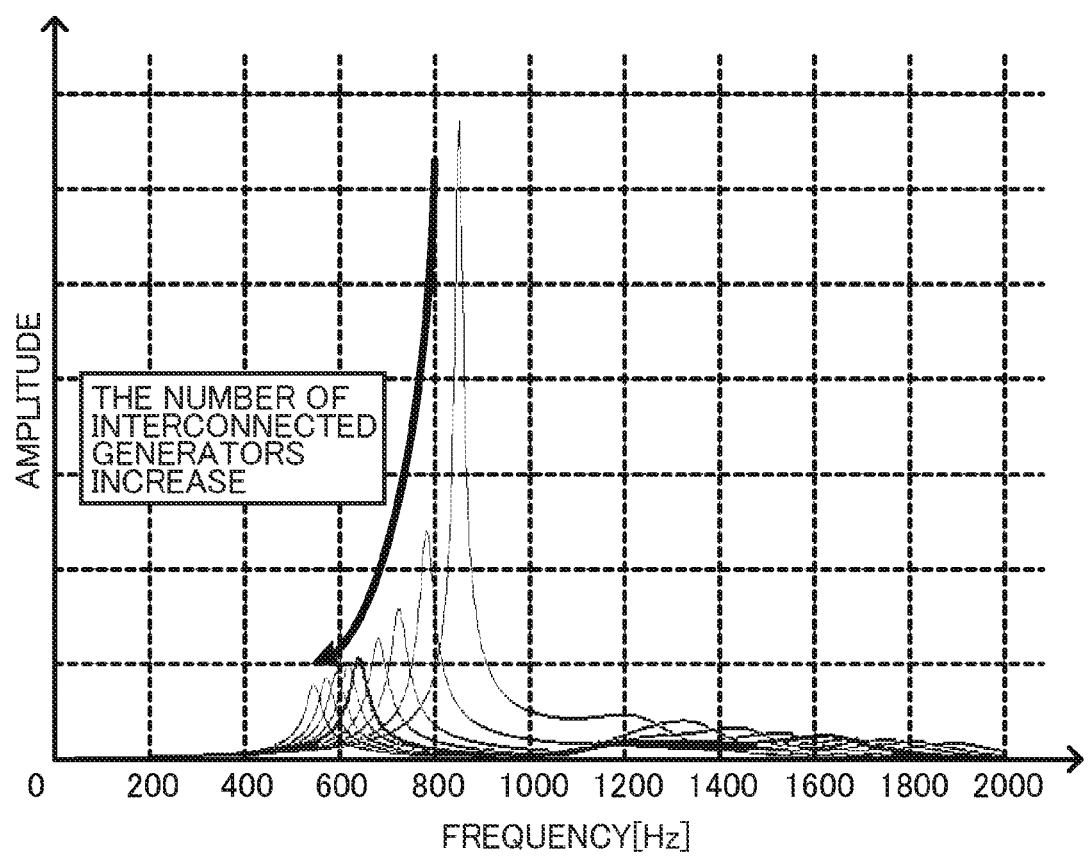
FIG. 18 is a diagram illustrating a relationship between the number of connected wind power generators and a resonance frequency.

When the resonance suppression device 1a according to the present embodiment is used, for example, as illustrated in FIGS. 5 and 6, only harmonic components (ninth, eleventh and thirteenth harmonic voltages and harmonic currents) contained in the connection point voltage V in FIG. 15 are suppressed, and thus a waveform of the connection point voltage V can be improved with the small compensation current i.

Second Embodiment

===Configuration and Operation of Resonance Suppression Device===

A configuration and an operation of a resonance suppression device according to a second embodiment of the present invention will hereinafter be described with reference to FIG. 7.

Figure 7:
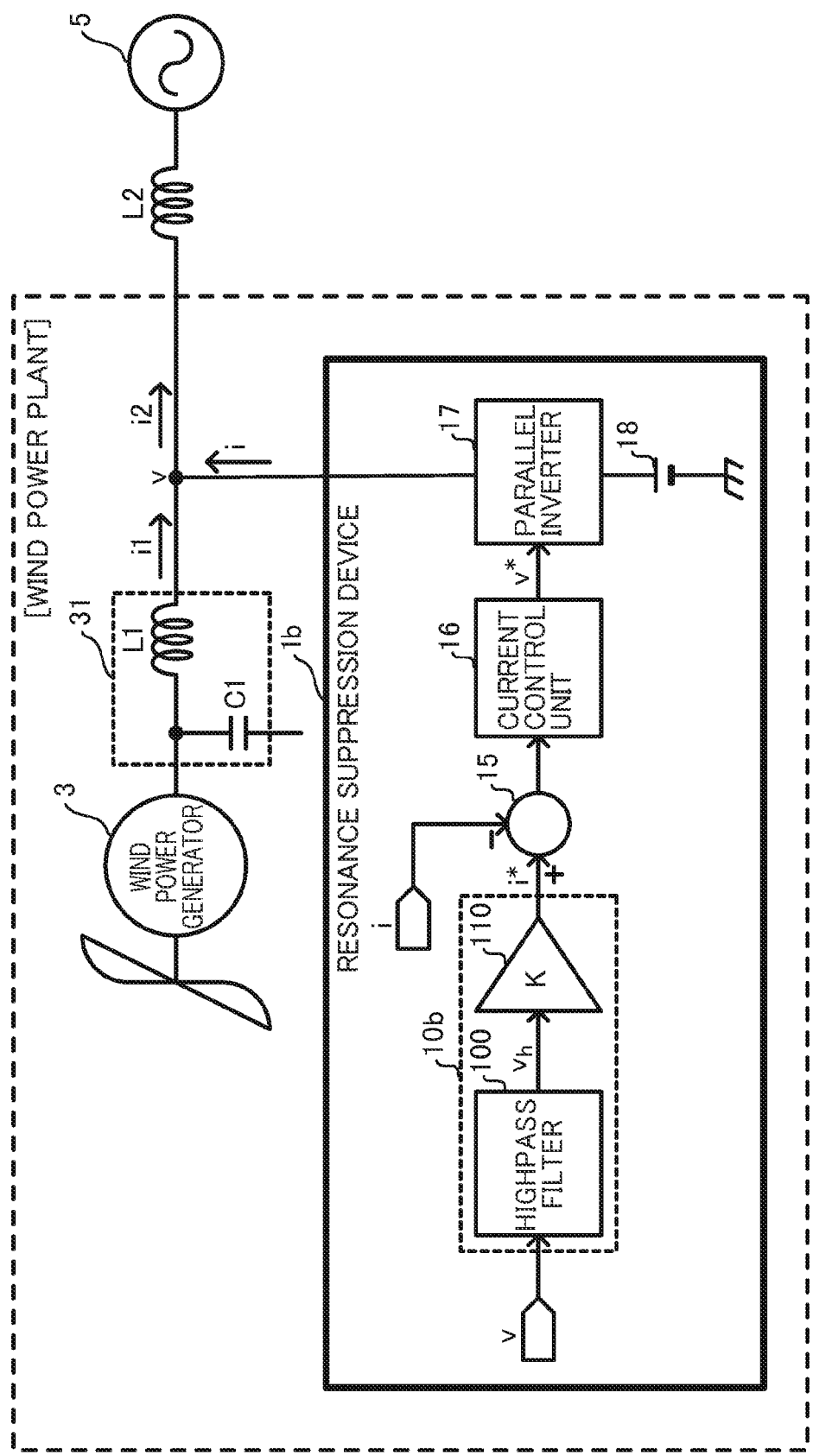
FIG. 7 is a block diagram illustrating a configuration of a resonance suppression device according to a second embodiment of the present invention.

A resonance suppression device 1b illustrated in FIG. 7 includes a current command value generation unit 10b in place of the current command value generation unit 10a, as compared with the resonance suppression device 1a according to the first embodiment. Further, the current command value generation unit 10b includes the highpass filter 100 and the transfer function 110. Here, since the current command value generation unit 10b does not include a coefficient control unit, the gain K results in a predetermined fixed value. Note that this fixed value may be determined according to, for example, the number of the wind power generators 3 in operation.

Figure 8:
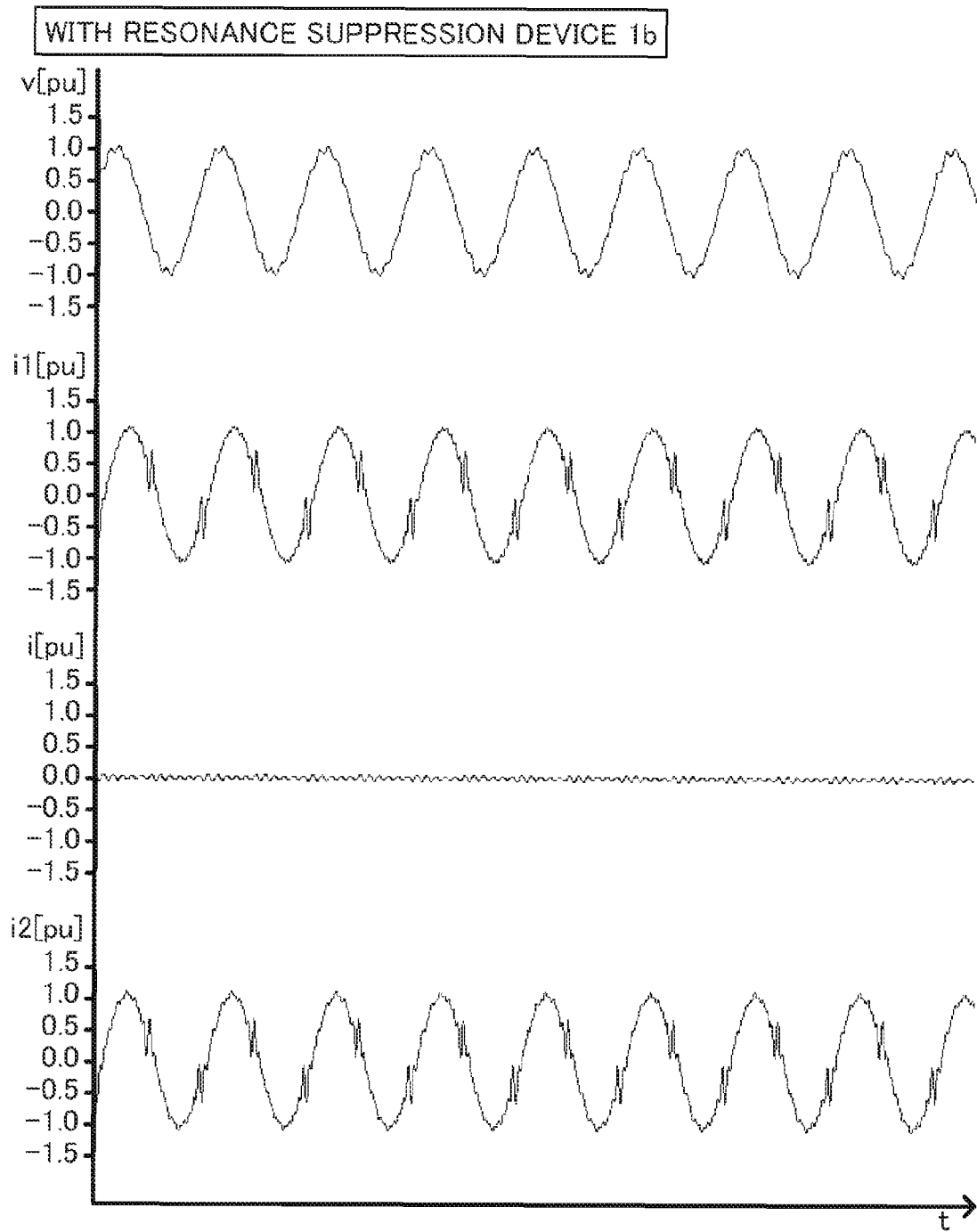
FIG. 8 is a schematic diagram illustrating an example of voltage V and current I, i1, i2 in which resonance is reduced by the resonance suppression device according to a second embodiment of the present invention.
Figure 9:
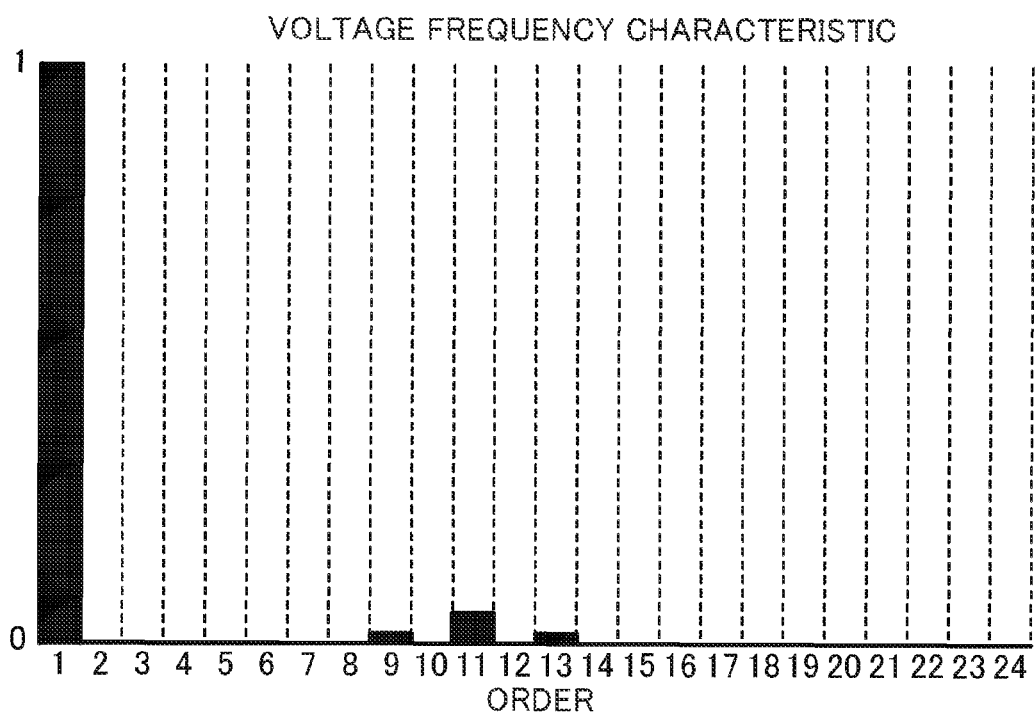
FIG. 9 is a schematic diagram illustrating an example of voltage/current frequency characteristics in which resonance is reduced by the resonance suppression device according to the second embodiment of the present invention.
Figure 9:
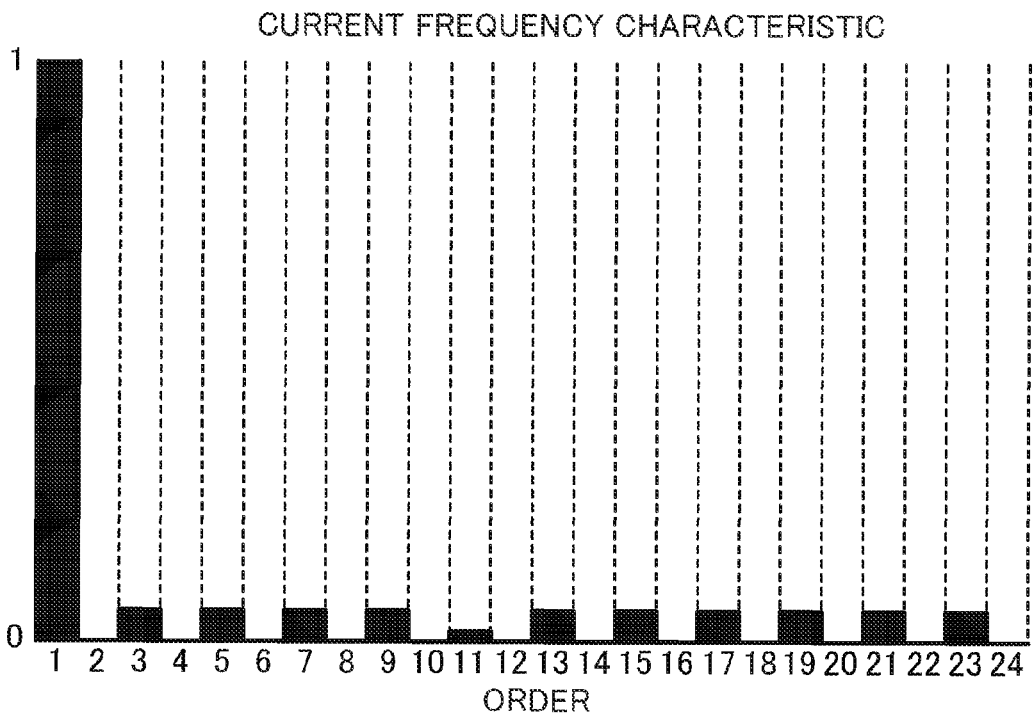

With the use of the resonance suppression device 1b according to the present embodiment, only a harmonic component contained in the connection point voltage V in FIG. 15 is suppressed, and thus a waveform of the connection point voltage V is improved with the small compensation current i. However, since the gain K is the predetermined fixed value in the present embodiment, eleventh harmonic voltage is not completely suppressed and harmonic distortion may remain in the connection point voltage V, as illustrated in FIGS. 8 and 9, for example.

Third Embodiment

===Configuration and Operation of Resonance Suppression Device===

A Configuration and an operation of a resonance suppression device according to a third embodiment of the present invention will hereinafter be described with reference to FIG. 10.

In the above first and second embodiments, the compensation current i which follows the current command value i* outputted from the current command value generation unit is outputted from the parallel inverter 17, and supplied to the power system 5 in a manner parallel with the wind power generator 3. Whereas, in the present embodiment, when a power conversion device capable of outputting the compensation current i is connected to the power system, the current command value i* is outputted to this power conversion device, thereby suppressing resonance.

Figure 10:
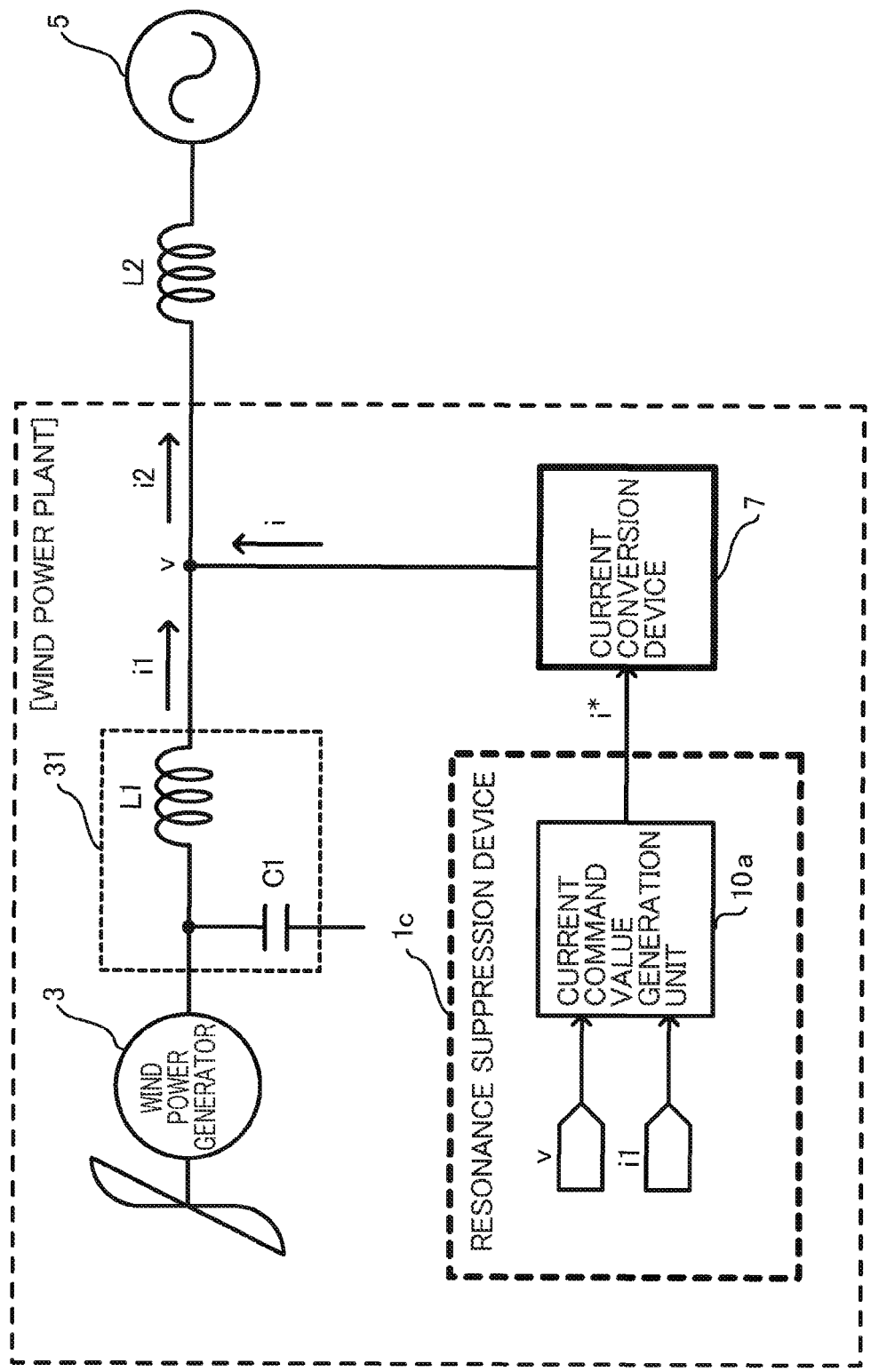
FIG. 10 is a block diagram illustrating a resonance suppression device according to a third embodiment of the present invention.

A resonance suppression device 1c illustrated in FIG. 10 includes the current command value generation unit 10a according to the first embodiment. Note that the resonance suppression device 1c may include the current command value generation unit 10b according to the second embodiment in place of the current command value generation unit 10a.

Voltage (voltage at the connection point between the wind power generator 3 and the power system 5) V of the power system 5 is inputted to the current command value generation unit 10a. Then, the current command value generation unit 10a generates the current command value i* and outputs it to a power conversion device 7 connected to the power system 5. Thereby, the compensation current i is supplied from the power conversion device 7 to the power system 5, and similarly to the first and the second embodiments, only a harmonic component contained in the connection point voltage V in FIG. 15 is suppressed, and thus a waveform of the connection point voltage V is improved with the small compensation current i. Note that, for example, a reactive power compensation device or the like can be used, other than an inverter or a UPFC, as a power conversion device capable of outputting such a compensation current i.

Fourth Embodiment

===Configuration of Resonance Suppression Device===

A configuration of a resonance suppression device according to a fourth embodiment of the present invention will hereinafter be described with reference to FIGS. 11 to 13.

Figure 11:
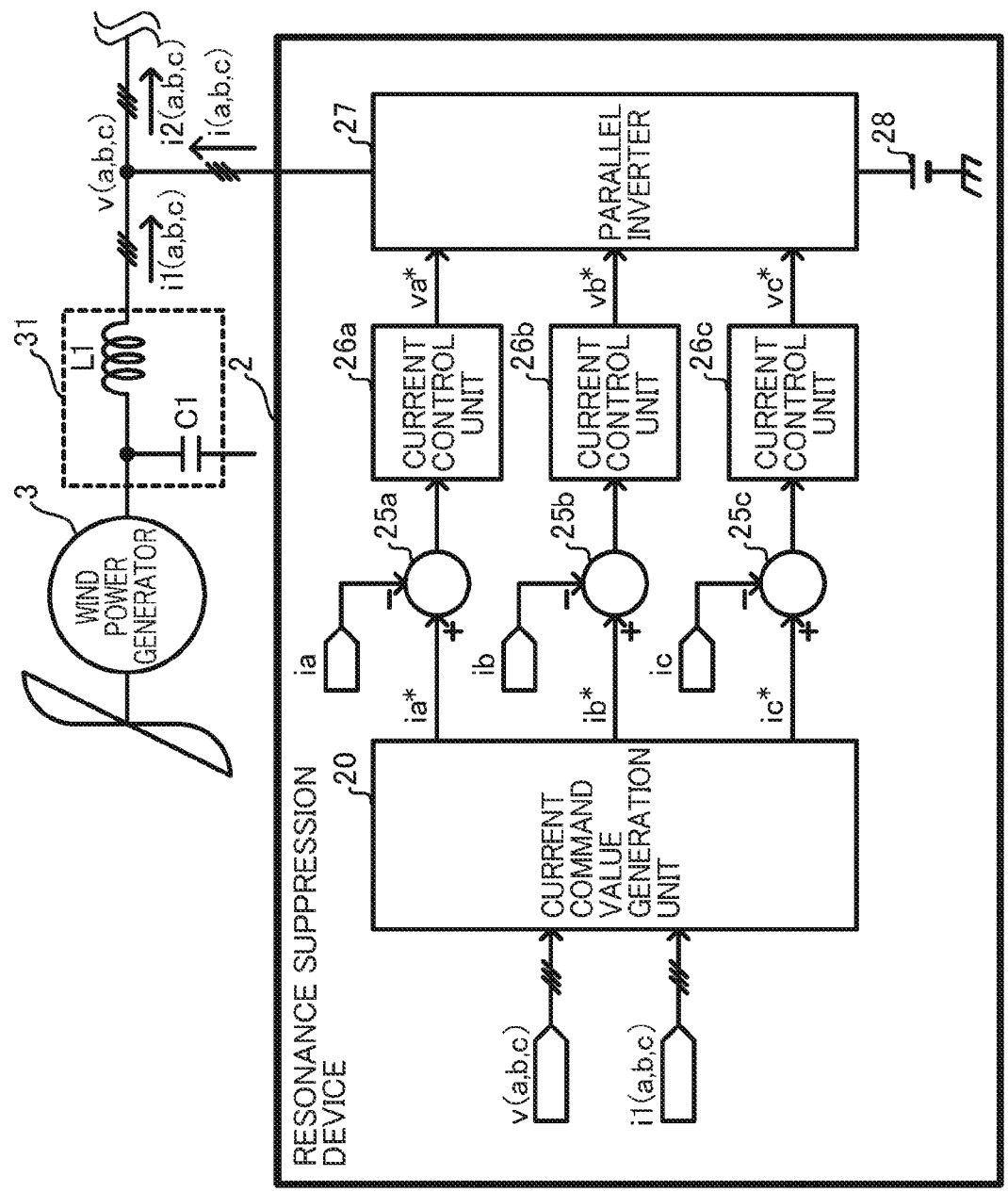
FIG. 11 is a block diagram illustrating a configuration of a resonance suppression device according to a fourth embodiment of the present invention.

A resonance suppression device 2 illustrated in FIG. 11 is a device configured to suppress resonance which occurs in three-phase power system. The resonance suppression device 2 includes: a current command value generation unit 20; addition units 25a to 25c; current control units 26a to 26c; a parallel inverter 27; and a direct current power supply 28. Note that, for example, the resonance suppression device 2 may include those other than the parallel inverter 27 and the direct current power supply 28 in the above components.

Connection point voltages Va, Vb, Vc of respective phases and output currents i1a, i1b, i1c of respective phases of the wind power generator 3 are inputted to the current command value generation unit 20. Further, current command values ia*, ib*, ic* with respect to output currents (compensation currents) ia, ib, ic of three phases of the three-phase parallel inverter 27 are outputted from the current command value generation unit 20.

The compensation currents ia, ib, ic and the current command values ia*, ib*, ic* with respect thereto are inputted to the addition units 25a, 25b, 25c, respectively. Further, respective differences (ia*−ia, ib*−ib, ic*−ic) between the current command values ia*, ib*, ic* and the compensation currents ia, ib, ic are inputted from the addition units 25a, 25b, 25c to the current control units 26a, 26b, 26c, respectively. Then, voltage command values Va*, Vb*, Vc* are outputted from the current control units 26a, 26b, 26c, respectively.

The direct current power supply 28 is connected to the parallel inverter 27. Further, voltage command values Va*, Vb*, Vc* of respective phases are inputted to the parallel inverter 27. Alternating currents (compensation currents) ia, ib, ic are outputted from the parallel inverter 27. Then, the compensation currents ia, ib, ic outputted from the parallel inverter 27 are supplied to a power system to which the output currents i1a, i1b, i1c of the wind power generator 3 are supplied in parallel therewith, respectively.

Figure 12:
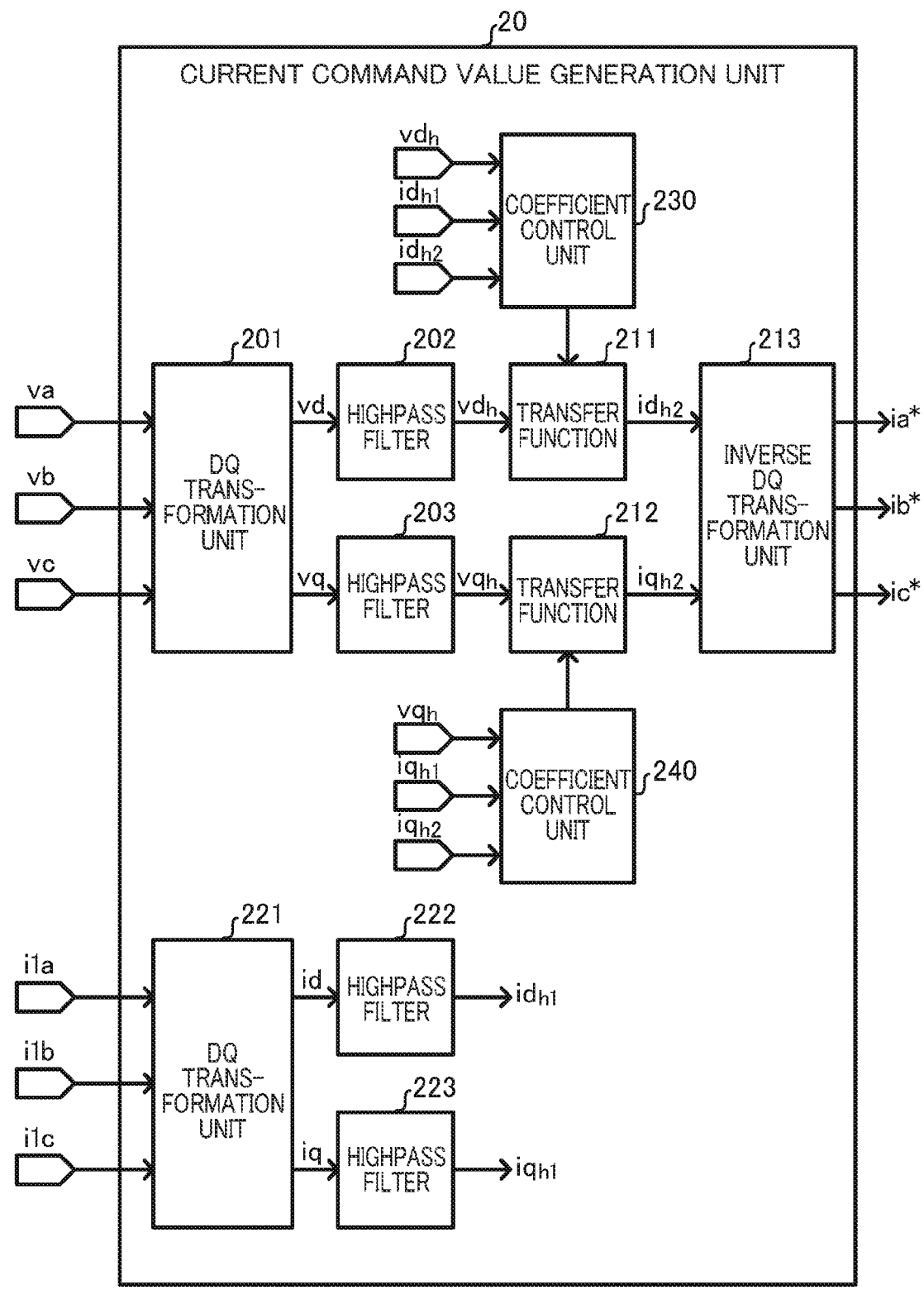
FIG. 12 is a block diagram illustrating a configuration of a current command value generation unit according to fourth embodiment of the present invention.

FIG. 12 illustrates a configuration of the current command value generation unit 20 according to the present embodiment. The current command value generation unit 20 illustrated in FIG. 12 includes: dq transformation units 201, 221; highpass filters 202, 203, 222, 223; transfer functions 211, 212; an inverse dq transformation unit 213; and coefficient control units 230, 240.

The connection point voltages Va, Vb, Vc of respective phases are inputted to the dq transformation unit 201, and a d-axis component (d-axis voltage) Vd and a q-axis component (q-axis voltage) Vq, which are obtained by dq transforming the voltages, are outputted from the dq transformation unit 201. Further, the d-axis voltage Vd is inputted to the highpass filter 202, and a harmonic component (harmonic voltage) $Vd_h$ of the d-axis voltage Vd is outputted from the highpass filter 202. On the other hand, the q-axis voltage Vq is inputted to the highpass filter 203. A harmonic component (harmonic voltage) $Vq_h$ of the q-axis voltage Vq is outputted from the highpass filter 203. Note that the harmonic voltages $Vd_h$ and $Vq_h$ are inputted to the transfer functions 211 and 212, respectively, and also inputted to the coefficient control units 230 and 240, respectively.

The output currents i1a, i1b, i1c of respective phases of the wind power generator 3 are inputted to the dq transformation unit 221. A d-axis component (d-axis current) id and a q-axis component (q-axis current) iq, which are obtained by dq transforming them, are outputted from the dq transformation unit 221. Further, the d-axis current id is inputted to the highpass filter 222. A harmonic component (harmonic current) $id_{h1}$ of the d-axis current id is outputted from the highpass filter 222. On the other hand, the q-axis current iq is inputted to the highpass filter 223. A harmonic component (harmonic current) $iq_{h1}$ of the q-axis current iq is outputted from the highpass filter 223. Note that the harmonic currents $id_{h1}$ and $iq_{h1}$ are inputted to the coefficient control units 230 and 240, respectively.

The harmonic voltages $Vd_h$ and $Vq_h$ are inputted to the transfer function 211 and 212, respectively. The output value $id_{h2}$ of the transfer function 211 and the output value $iq_{h2}$ of the transfer function 212 are inputted to the inverse dq transformation unit 213. Note that the output value $id_{h2}$ of the transfer function 211 and the output value $iq_{h2}$ of the transfer function 212 are also inputted to the coefficient control units 230 and 240, respectively. Further, the current command values ia*, ib*, ic* of respective phases are outputted from the inverse dq transformation unit 213.

The harmonic voltage $Vd_h$, the harmonic currents $id_{h1}$, and the output value $id_{h2}$ of the transfer function 211 are inputted to the coefficient control unit 230. The coefficient control unit 230 controls a coefficient of the transfer function 211 based on them. On the other hand, the harmonic voltage $Vq_h$, the harmonic current $iq_{h1}$, and the output value $iq_{h2}$ of the transfer function 212 are inputted to the coefficient control unit 240. The coefficient control unit 240 controls a coefficient of the transfer function 212 based on them.

Figure 13:
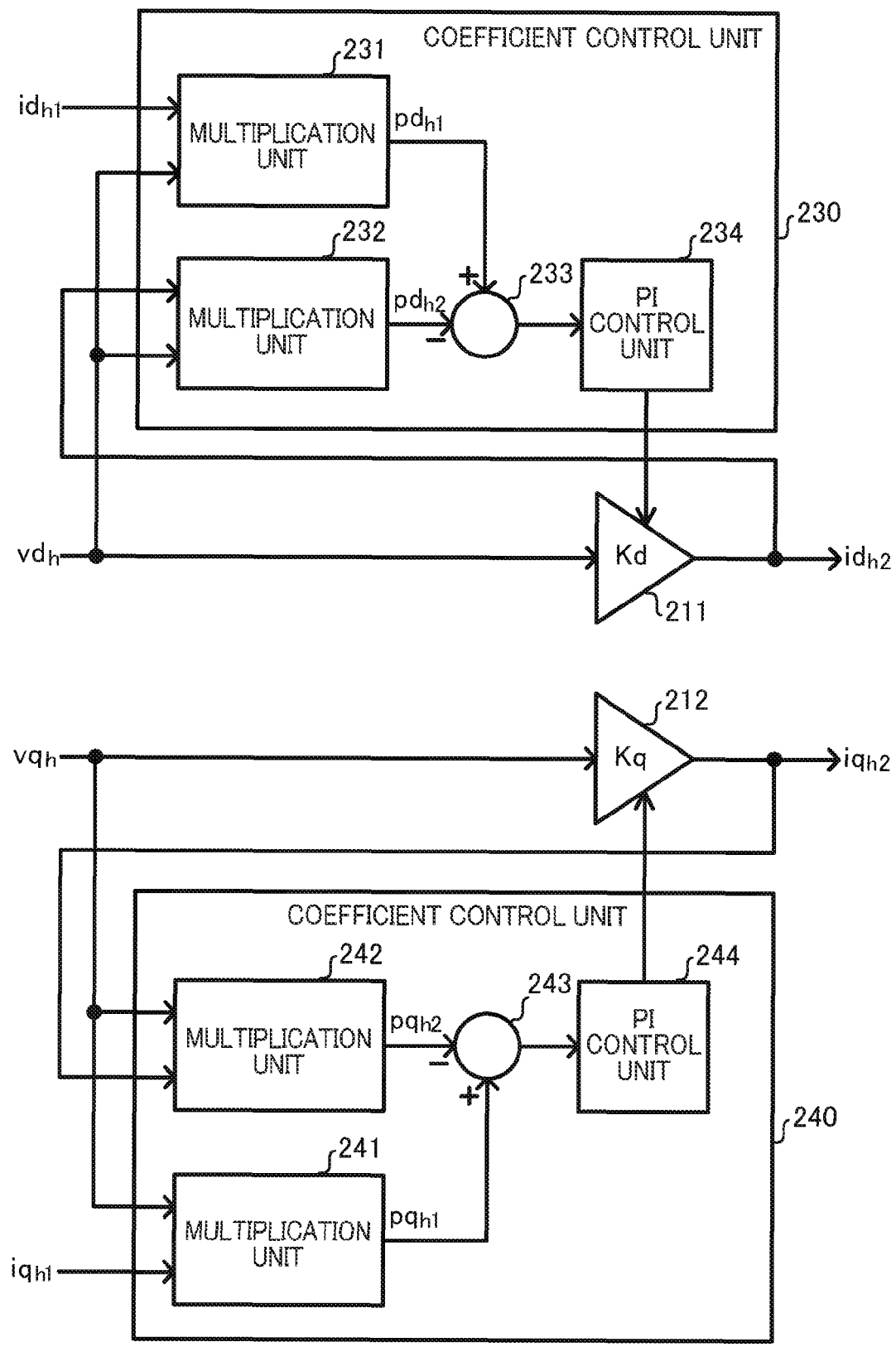
FIG. 13 is a block diagram illustrating a configuration of a coefficient control unit according to fourth embodiment of the present invention.
Figure 14:
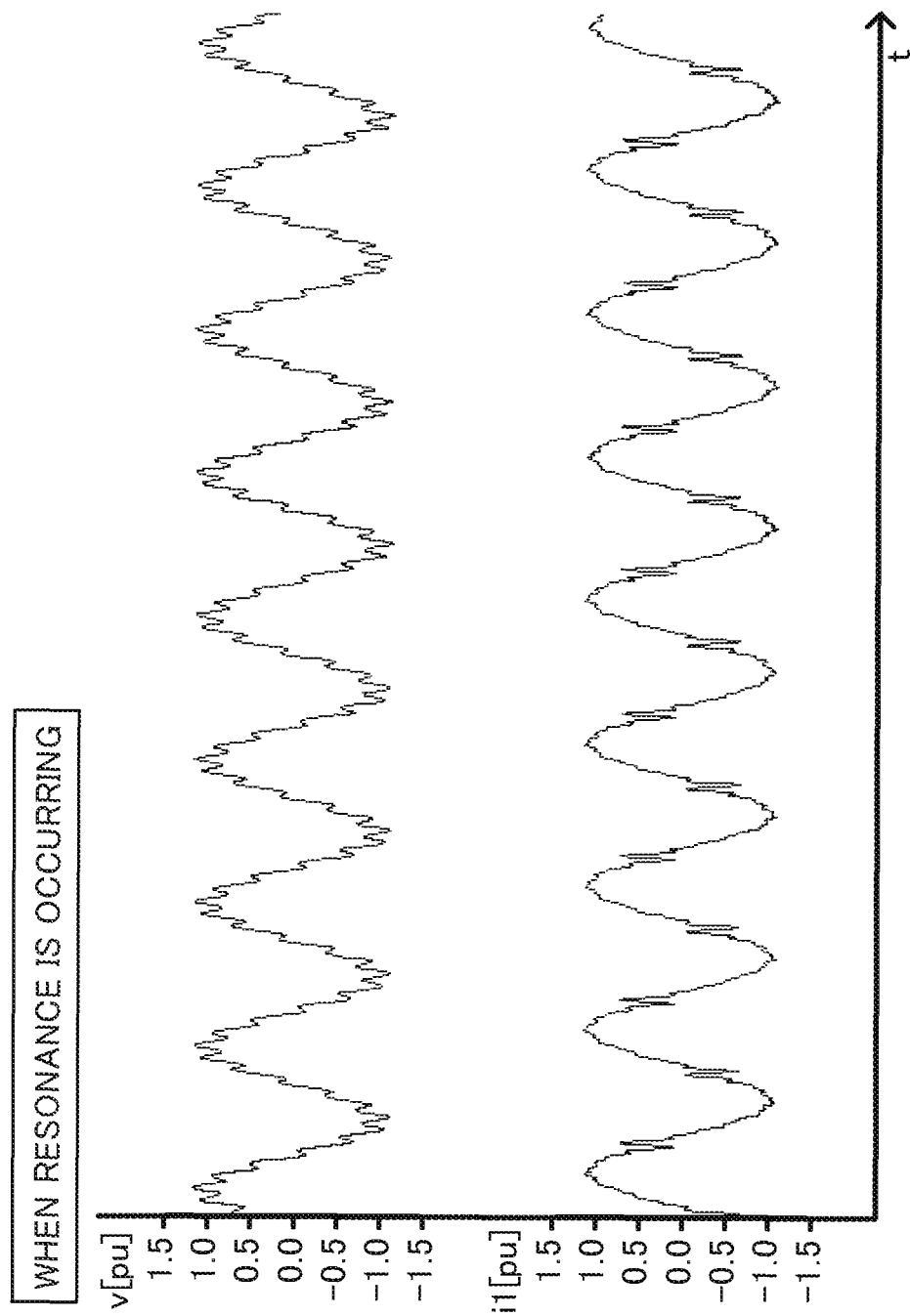
FIG. 14 is a schematic diagram illustrating an example of voltage V and current i1 when resonance is occurring.

FIG. 13 illustrates configurations of the coefficient control units 230 and 240 according to the present embodiment. The coefficient control unit 230 illustrated in FIG. 13 includes: multiplication units 231, 232; an addition unit 233; and a PI control unit 234. On the other hand, the coefficient control unit 240 includes: multiplication units 241, 242; an addition unit 243; and a PI control unit 244.

The harmonic current $id_{h1}$ and the harmonic voltage $Vd_h$ are inputted to the multiplication unit 231. The product $pd_{h1}$ thereof is outputted from the multiplication unit 231. Further, the output value $id_{h2}$ of the transfer function 211 and the harmonic voltage $Vd_h$ are inputted to the multiplication unit 232. The product $pd_{h2}$ thereof is outputted from the multiplication unit 232.

The output value $pd_{h1}$ of the multiplication unit 231 and the output value $pd_{h2}$ of the multiplication unit 232 are inputted to the addition unit 233. A difference ($pd_{h1}-pd_{h2}$) between the output value $pd_{h1}$ of the multiplication unit 231 and the output value $pd_{h2}$ of the multiplication unit 232 is inputted from the addition unit 233 to the PI control unit 234. Further, the PI control unit 234 controls a coefficient of the transfer function 211 based on the output value ($pd_{h1}-pd_{h2}$) of the addition unit 233. As an example, the transfer function 211 is configured with only the gain Kd. The PI control unit 234 controls the gain Kd based on the output value ($pd_{h1}-pd_{h2}$) of the addition unit 233.

The harmonic current $iq_{h1}$ and the harmonic voltage $Vq_h$ are inputted to the multiplication unit 241. The product $pq_{h1}$ thereof is outputted from the multiplication unit 241. Further, the output value $iq_{h2}$ of the transfer function 212 and the harmonic voltage $Vq_h$ are inputted to the multiplication unit 242. The product $pq_{h2}$ thereof is outputted from the multiplication unit 242.

The output value $pq_{h1}$ of the multiplication unit 241 and the output value $pq_{h2}$ of the multiplication unit 242 are inputted to the addition unit 243. A difference $(pq_{h1}-pq_{h2})$ between the output value $pq_{h1}$ of the multiplication unit 241 and the output value $pq_{h2}$ of the multiplication unit 242 is inputted from the addition unit 243 to the PI control unit 244. Further, the PI control unit 244 controls a coefficient of the transfer function 212 based on the output value $(pq_{h1}-pq_{h2})$ of the addition unit 243. As an example, the transfer function 212 is configured with only the gain Kq. The PI control unit 244 controls the gain Kq based on the output value $(pq_{h1}-pq_{h2})$ of the addition unit 243. Note that a method of controlling the PI control units 234, 244 is not limited to PI control, but may be I control, for example.

===Operation of Resonance Suppression Device===

Next, an operation of the resonance suppression device according to the present embodiment will be described.

The dq transformation unit 201 dq transforms the connection point voltages Va, Vb, Vc of respective phases, to output a d-axis component (d-axis voltage) Vd and a q-axis component (q-axis voltage) Vq. Further, the highpass filter 202 extracts a fluctuation component of the d-axis voltage Vd, to extract the harmonic component (harmonic voltage) $Vd_h$ contained in the d-axis voltage Vd and output the resultant. On the other hand, the highpass filter 203 extracts a fluctuation component of the q-axis voltage Vq, to extract the harmonic component (harmonic voltage) $Vq_h$ contained in the q-axis voltage Vq and output the resultant. Thus, in the present embodiment, the highpass filters 202 and 203 correspond to the first highpass filter.

Further, the output value (harmonic voltage $Vd_h$) of the highpass filter 202 is multiplied by the gain Kd, to obtain the d-axis component $id_{h2}$. On the other hand, the output value (harmonic voltage $Vq_h$) of the highpass filter 203 is multiplied by the gain Kq, to obtain a q-axis component $iq_{h2}$. Then, the inverse dq transformation unit 213 performs inverse dq transformation of the obtained d-axis component $id_{h2}$ and q-axis component $iq_{h2}$, to output the current command values ia*, ib*, ic* of respective phases.

The dq transformation unit 221 dq transforms the output currents i1a, i1b, i1c of respective phases of the wind power generator 3, to output a d-axis component (d-axis current) id and a q-axis component (q-axis current) iq. Further, the highpass filter 222 extracts a fluctuation component of the d-axis current id, to extract the harmonic component (harmonic current) $id_{h1}$ contained in the d-axis current id and output the resultant. On the other hand, the highpass filter 223 extracts a fluctuation component of the q-axis current iq, to extract the harmonic component (harmonic current) $iq_{h1}$ contained in the q-axis current iq and output the resultant. Thus, in the present embodiment, the highpass filters 222 and 223 correspond to the second highpass filter.

The coefficient control unit 230 controls a coefficient of the transfer function 211 based on the output values of the highpass filters 202, 222 and the transfer function 211 (harmonic voltage $Vd_h$ and harmonic currents $id_{h1}$, $id_{h2}$). As an example, as illustrated in FIG. 13, the coefficient control unit 230 controls the gain Kd so as to match the output value of the multiplication unit 232 (the product $pd_{h2}$ of output value $id_{h2}$ of transfer function 211 and harmonic voltage $Vd_h$) with the output value of the multiplication unit 231 (the product $pd_{h1}$ of harmonic current $id_{h1}$ and harmonic voltage $Vd_h$).

On the other hand, the coefficient control unit 240 controls a coefficient of the transfer function 212 based on the output values of the highpass filters 203, 223 and the transfer function 212 (harmonic voltage $Vq_h$ and harmonic currents $iq_{h1}$, $iq_{h2}$). As an example, as illustrated in FIG. 13, the coefficient control unit 240 controls the gain Kq so as to match the output value of the multiplication unit 242 (the product $pq_{h2}$ of output value $iq_{h2}$ of transfer function 212 and harmonic voltage $Vq_h$) with the output value of the multiplication unit 241 (the product $pq_{h1}$ of harmonic current $iq_{h1}$ and harmonic voltage $Vq_h$).

The current control units 26a, 26b, 26c illustrated in FIG. 11 respectively output voltage command values Va*, Vb*, Vc corresponding to differences (ia*−ia, ib*−ib, ic*−ic) between the current command values ia*, ib*, ic* of respective phases, and the output currents (compensation currents) ia, ib, ic of respective phases of the parallel inverter 27. Further, the parallel inverter 27 performs PWM control based on the voltage command values Va*, Vb*, Vc*, to convert the power of the direct current power supply 28 into alternate current power, and output the compensation currents ia, ib, ic. Thus, the current control units 26a, 26b, 26c control the parallel inverter 27 so that the compensation currents ia, ib, ic follow the current command values ia*, ib*, ic*, respectively, and the parallel inverter 27 supplies, to a power system, the compensation currents ia, ib, ic which follow the current command values ia*, ib*, ic*.

In this manner, the resonance suppression device 2 according to the present embodiment dq transform the connection point voltages Va, Vb, Vc of respective phases, then extract fluctuation components (harmonic voltages $Vd_h$, $Vq_h$), multiply the resultants by the gains Kd, Kq, and perform inverse dq transformation of the multiplied resultants, to generate the current command values ia*, ib*, ic*, in the current command value generation unit 20. Then, the compensation currents ia, ib, ic, which respectively follow the current command values ia*, ib*, ic*, are supplied to the power system, thereby being able to reduce harmonic distortion of the connection point voltages Va, Vb, Vc that is caused by harmonic voltage.

Furthermore, the current command value generation unit 20 dq transforms the output currents i1a, i1b, i1c of respective phases of the wind power generator 3, then extracts fluctuation components (harmonic currents $id_{h1}$, $iq_{h1}$), and controls the gains Kd, Kq based on the resultants. Thereby, even if a resonance point changes, the appropriate gains Kd, Kq corresponding thereto are used to be able to appropriately suppress harmonic voltage whose frequency characteristics, etc., are not identified, to suppress resonance.

Fifth Embodiment

===Configuration and Operation of Resonance Suppression Device===

Figure 19:
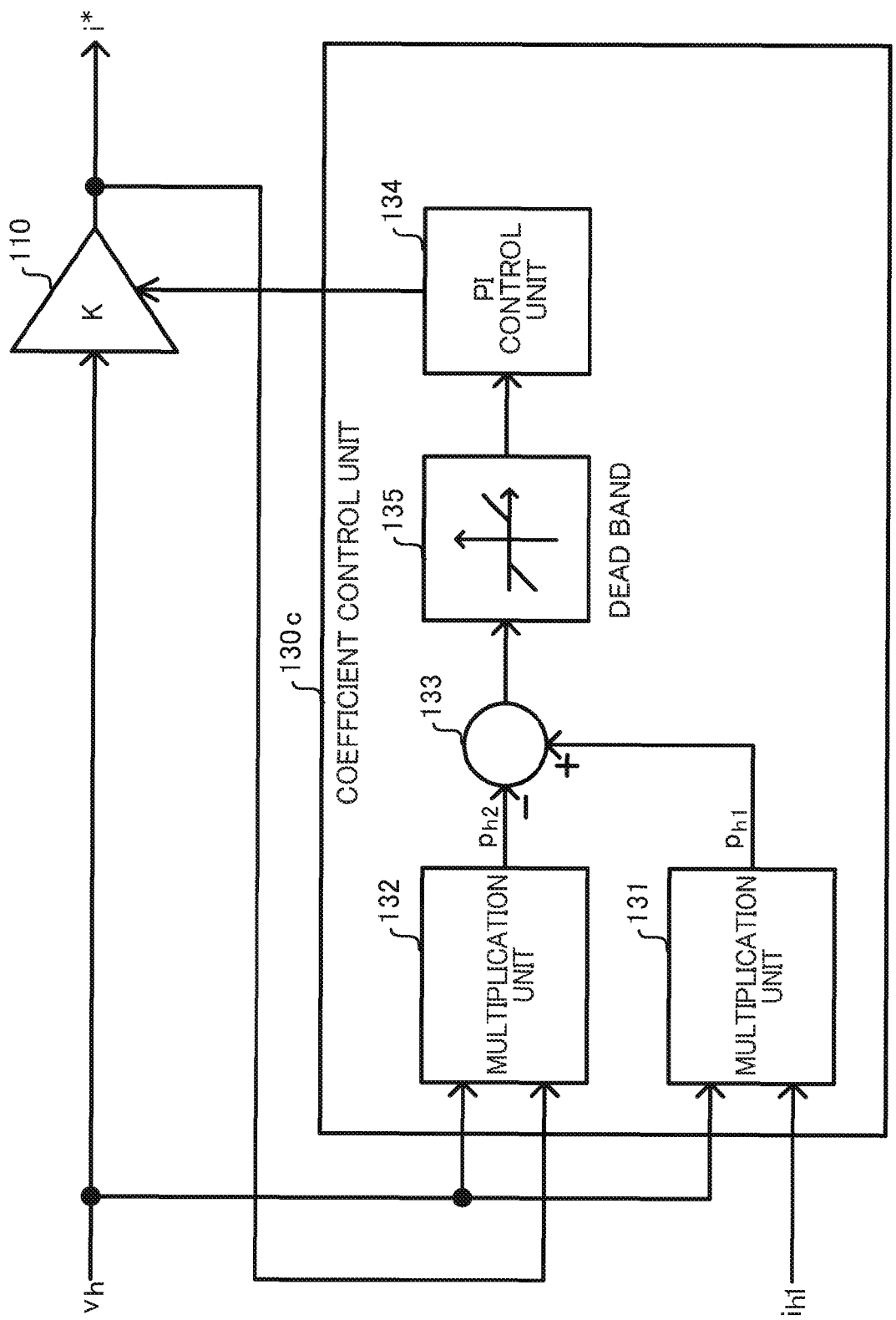
FIG. 19 is a block diagram illustrating a configuration of a coefficient control unit according to a fifth embodiment of the present invention.

A configuration and an operation of a resonance suppression device according to a fifth embodiment of the present invention will hereinafter be described with reference to FIGS. 1 and 19. FIG. 19 is a block diagram illustrating a configuration of a coefficient control unit according to the present embodiment. Note that components similar to the components in FIG. 3 are designated as the same reference numerals and descriptions thereof will be omitted.

A resonance suppression device 4a (FIG. 1) according to the present embodiment includes a coefficient control unit 130c in place of the coefficient control unit 130a of the resonance suppression device 1a according to the first embodiment.

The coefficient control unit 130c (FIG. 19) includes a dead band 135. The dead band 135 is provided between the addition unit 133 and the PI control unit 134, in order to prevent an integrator of the PI control unit 134 from being saturated due to the output value ($p_{h1}-p_{h2}$) of the addition unit 133 not being zero.

A dead band width of the dead band 135 is experimentally determined based on, for example, the relationship between the dead band width and the current command value i*. Note that the dead band width corresponds to the minimum value inputted to the PI control unit 134 in the output value ($p_{h1}-p_{h2}$) of the addition unit 133. That is, for example, when the output value ($p_{h1}-p_{h2}$) is greater than the dead band width, the output value ($p_{h1}-p_{h2}$) is inputted to the PI control unit 134, and when the output value ($p_{h1}-p_{h2}$) is smaller than the dead band width, the output value ($p_{h1}-p_{h2}$) is not inputted to the PI control unit 134.

The use of the resonance suppression device 4a according to the present embodiment can prevent the integrator of the PI control unit 134 from being saturated due to the output value ($p_{h1}-p_{h2}$) of the addition unit 133 not being zero. That is, it is prevented that, due to the output value ($p_{h1}-p_{h2}$) of the addition unit 133 not being zero, the value of the gain K as the transfer function 110 increases and the compensation current i becomes excessive.

Sixth Embodiment

===Configuration of Resonance Suppression Device===

Figure 20:
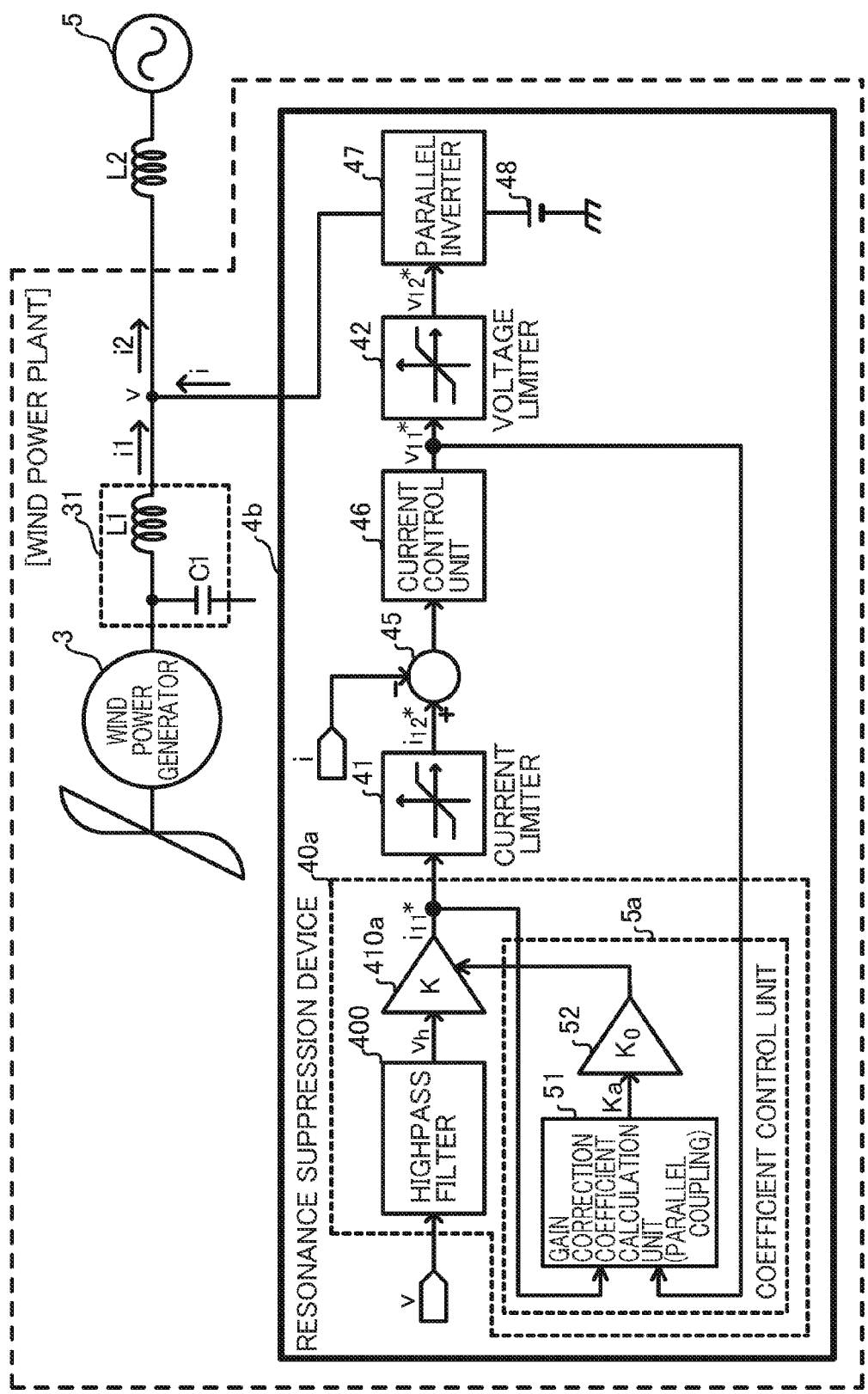
FIG. 20 is a block diagram illustrating a configuration of a resonance suppression device according to a sixth embodiment of the present invention.

A configuration of a resonance suppression device according to a sixth embodiment of the present invention will hereinafter be described with reference to FIG. 20. FIG. 20 is a block diagram illustrating a configuration of the resonance suppression device according to the present embodiment.

A resonance suppression device 4b includes: a current command value generation unit 40a; a current limiter 41; a voltage limiter 42; an addition unit 45; a current control unit 46; a parallel inverter 47; and a direct current power supply 48. Note that, for example, the resonance suppression device 4b may include those other than the parallel inverter 47 and the direct current power supply 48 in the above components. The configurations of the addition unit 45, the current control unit 46, the parallel inverter 47, and the direct current power supply 48 are similar to the addition unit 15 (FIG. 1), the current control unit 16, the parallel inverter 17, and the direct current power supply 18 according to the first embodiment, respectively.

The connection point voltage V, a current command value $i_{11}$*, and a voltage command value $V_{11}$* are inputted to the current command value generation unit 40a. The current command value $i_{11}$* is outputted from the current command value generation unit 40a. Note that the details of the current command value generation unit 40a will be described later.

The current command value $i_{11}$* is inputted to the current limiter 41, and a current command value $i_{12}$* in a predetermined range from the lower limit −Ilimit to the upper limit +Ilimit is outputted therefrom. Note that the lower limit −Ilimit and the upper limit +Ilimit are determined according the output capacity of the parallel inverter 47. For example, when the current command value $i_{11}$* is in the predetermined range, the current limiter 41 outputs the current command value $i_{12}$* having the same value as the current command value $i_{11}$*. Further, for example, when the current command value $i_{11}$* exceeds the predetermined range, the current limiter 41 outputs the current command value $i_{12}$* having the same value as the upper limit +Ilimit. Further, for example, when the current command value $i_{11}$* falls below the predetermined range, the current limiter 41 outputs the current command value $i_{12}$* having the same value as the lower limit −Ilimit.

The compensation current i and the current command value $i_{12}$* with respect thereto are inputted to the addition unit 45. A difference ($i_{12}$*−i) between the current command value $i_{12}$* and the compensation current i is inputted from the addition unit 45 to the current control unit 46. Then, the voltage command value $V_{11}$* is outputted from the current control unit 46.

The voltage command value $V_{11}$* is inputted to the voltage limiter 42, and a voltage command value $V_{12}$* in a predetermined range from the lower limit −Vlimit to the upper limit +Vlimit is outputted therefrom. Note that the lower limit −Vlimit and the upper limit +Vlimit are determined according to the output capacity of the parallel inverter 47. For example, when the voltage command value $V_{11}$* is in a predetermined range, the voltage limiter 42 outputs the voltage command value $V_{12}$* having the same value as the voltage command value $V_{11}$*. Further, for example, the voltage command value $V_{11}$* exceeds the predetermined range, the voltage limiter 42 outputs the voltage command value $V_{12}$* having the same value as the upper limit +Vlimit. Further, for example, when the voltage command value $V_{11}$* falls below the predetermined range, the voltage limiter 42 outputs the voltage command value $V_{12}$* having the same value as the lower limit −Vlimit.

The voltage limiter 42 is connected to the parallel inverter 47. Further, the voltage command value $V_{12}$* is inputted to the parallel inverter 47, and the compensation current i is outputted from the parallel inverter 47.

===Current Command Value Generation Unit===

Figure 21:
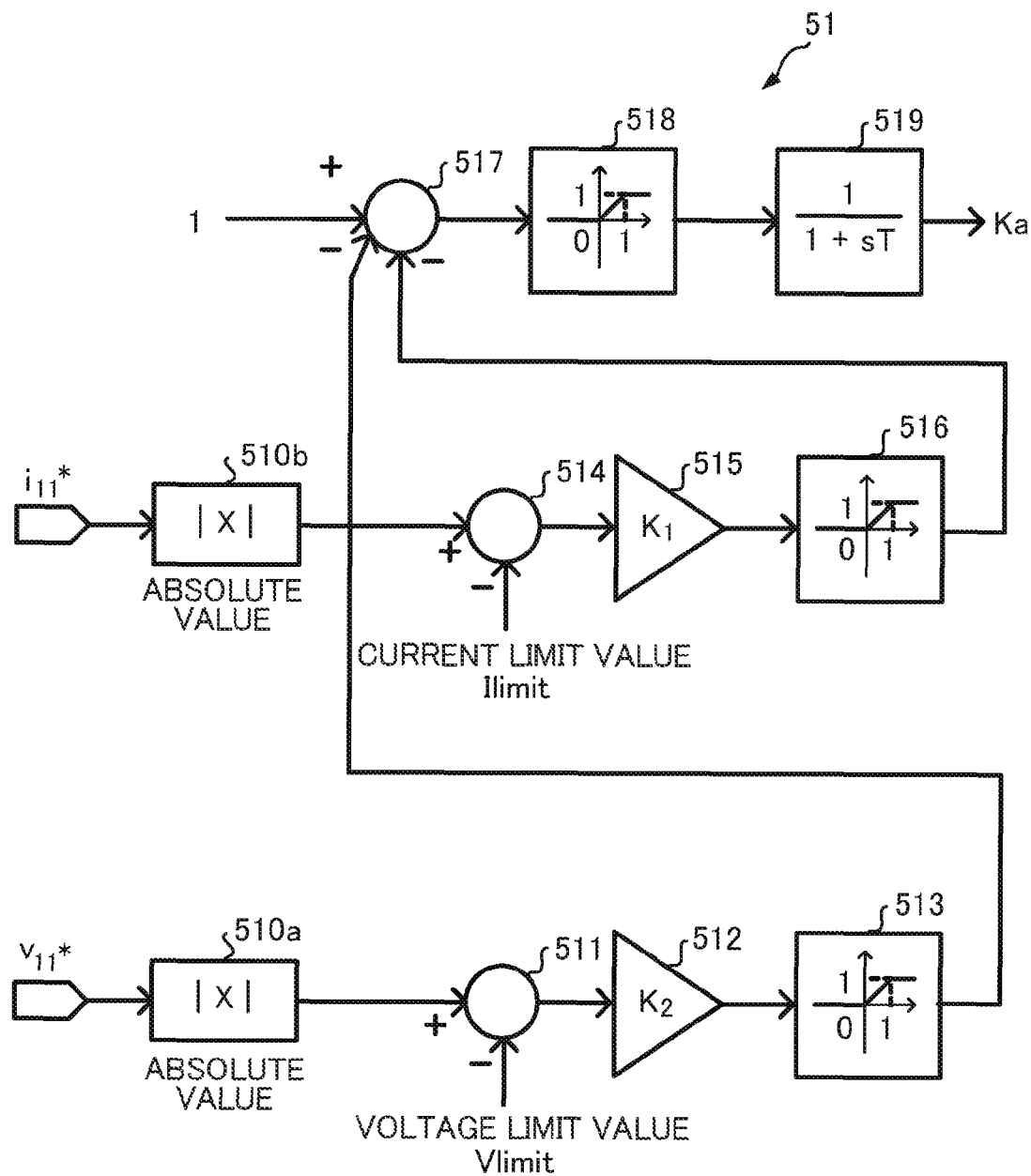
FIG. 21 is a configuration of block diagram illustrating a gain correction coefficient calculation unit according to a sixth embodiment of the present invention.

A current command value generation unit according to the sixth embodiment of the present invention will hereinafter be described with reference to FIGS. 20 and 21. FIG. 21 is a block diagram illustrating a configuration of a gain correction coefficient calculation unit according to the present embodiment.

The connection point voltage V, the current command value $i_{11}$*, and the voltage command value $V_{11}$* are inputted to the current command value generation unit 40a as described above, and the current command value $i_{11}$* is outputted therefrom. The current command value generation unit 40a includes a highpass filter 400, a transfer function 410a, and a coefficient control unit 5a. Note that the configurations of the highpass filter 400, the transfer function 410a are similar to the configurations of the highpass filter 100 (FIG. 2A) and the transfer function 110 according to the first embodiment.

The current command value $i_{11}$* and the voltage command value $V_{11}$* are inputted to the coefficient control unit 5a, and the coefficient control unit 5a controls a coefficient of the transfer function 410a. As an example, the transfer function 410a is configured with only the gain K. The coefficient control unit 5a controls the gain K based on the current command value $i_{11}$* and the voltage command value $V_{11}$*. The coefficient control unit 5a includes a gain correction coefficient calculation unit 51 and a gain $K_0$ serving as a transfer function 52.

For example, a relatively large fixed value other than zero is set as the gain $K_0$. Thus, when the gain $K_0$ is set as the gain K of the transfer function 410a by the coefficient control unit 5a, responsivity of the compensation current i with respect to fluctuations of the harmonic voltage $V_h$ can be improved.

Here, when impedance of a harmonic filter 31 varies with variation in the number of the wind power generators 3, for example, the current command value $i_{11}{}^*$ may deviate from the predetermined range of the current limiter 41, or the voltage command value $V_{11}{}^*$ may deviate from the predetermined range of the voltage limiter 42. In such cases, the current command value $i_{12}{}^*$ or the voltage command value $V_{12}{}^*$ results in values limited by the current limiter 41 or the voltage limiter 42 (for example, solid line Z1 in FIG. 22 and solid line Z3 in FIG. 23), and the compensation current i itself may cause a harmonic. Thus, it is desirable to correct (adjust) a value that is set to the gain K.

The current command value $i_{11}{}^*$ and the voltage command value $V_{11}{}^*$ are inputted to the gain correction coefficient calculation unit 51, and a gain correction coefficient $K_a$ is outputted therefrom. A result of multiplying the gain correction coefficient $K_a$ by the gain $K_0$ is set as the gain K of the transfer function 410a. That is, the gain correction coefficient $K_a$ exerts a function of correcting a value of the gain K. The gain correction coefficient calculation unit 51 includes: absolute value generation units 510a, 510b; addition units 511, 514, 517; sensitivity adjustment units 512, 515; excess limiters 513, 516, 518; and a lag element 519.

The voltage command value $V_{11}{}^*$ is inputted to the absolute value generation unit 510a, and the absolute value of the voltage command value $V_{11}{}^*$ is outputted therefrom. The output value of the absolute value generation unit 510a and a voltage limit value Vlimit are inputted to the addition unit 511, and a difference ($|V_{11}{}^*|$−Vlimit) between the output of the absolute value generation unit 510a and the voltage limit value Vlimit is outputted therefrom. Note that the voltage limit value Vlimit may correspond to, for example, the absolute value of the upper limit and the lower limit of the voltage limiter 42. The sensitivity adjustment unit 512 amplifies the inputted difference ($|V_{11}{}^*|$−Vlimit) based on a gain $K_2$ and output the resultant. Note that the gain $K_2$ may be determined, for example, based on an experiment, a simulation, or the like on whether a value outputted from the sensitivity adjustment unit 512 falls within a range from 0 to 1, or the like.

The output value of the sensitivity adjustment unit 512 is inputted to the excess limiter 513, and a value within a range from 0 to 1 is outputted therefrom. For example, when the output value of the sensitivity adjustment unit 512 is in a range from 0 to 1, the excess limiter 513 outputs the same value as the output value of the sensitivity adjustment unit 512. Further, for example, when the output value of the sensitivity adjustment unit 512 is greater than 1, the excess limiter 513 outputs 1. Further, for example, when the output value of the sensitivity adjustment unit 512 is smaller than 0, the excess limiter 513 outputs 0.

The current command value $i_{11}{}^*$ is inputted to the absolute value generation unit 510b, and the absolute value of the current command value $i_{11}{}^*$ is outputted therefrom. The output value of the absolute value generation unit 510b and a current limit value Ilimit are inputted to the addition unit 514, a difference ($|i_{11}{}^*|$−Ilimit) between the output of the absolute value generation unit 510b and the current limit value Ilimit is outputted therefrom. Note that the current limit value Ilimit may correspond to, for example, the absolute value of the upper limit and the lower limit of the current limiter 41. The sensitivity adjustment unit 515 amplifies the inputted difference ($|i_{11}{}^*|$−Ilimit) based on the gain $K_1$ and output the resultant. Note that the gain $K_1$ may be determined, for example, based on an experiment, a simulation, or the like on whether a value outputted from the sensitivity adjustment unit 515 falls within a range from 0 to 1, or the like.

The output value of the sensitivity adjustment unit 515 is inputted to the excess limiter 516, and a value within a range from 0 to 1 is outputted therefrom. Note that the configuration of the excess limiter 516 is similar to the configuration of the excess limiter 513.

Respective output values of the excess limiters 513 and 516 and 1 serving as an initial value are inputted to the addition unit 517, and a value obtained by subtracting, from 1, the sum of the output values of the excess limiters 513, 516 is outputted therefrom. The output value of the addition unit 517 is inputted to the excess limiter 518, and a value in a range from 0 to 1 is outputted therefrom. Note that the configuration of the excess limiter 518 is similar to the configuration of the excess limiter 513.

The output value of the excess limiter 518 is inputted to the lag element 519 and, for example, a first order lag is added to the inputted output value of the excess limiter 518, and the gain correction coefficient $K_a$ is outputted therefrom. The lag element 519 has a time constant sufficiently larger than a period of the compensation current i. Thus, for example, this can prevent the gain K from oscillating due to the current command value $i_{11}{}^*$ and the voltage command value $V_{11}{}^*$ corresponding to alternate currents. Thus, it is prevented that the compensation current i itself causes harmonics, and harmonic components of the connection point voltage V can be reliably eliminated.

===Operation of Resonance Suppression Device===

Figure 22:
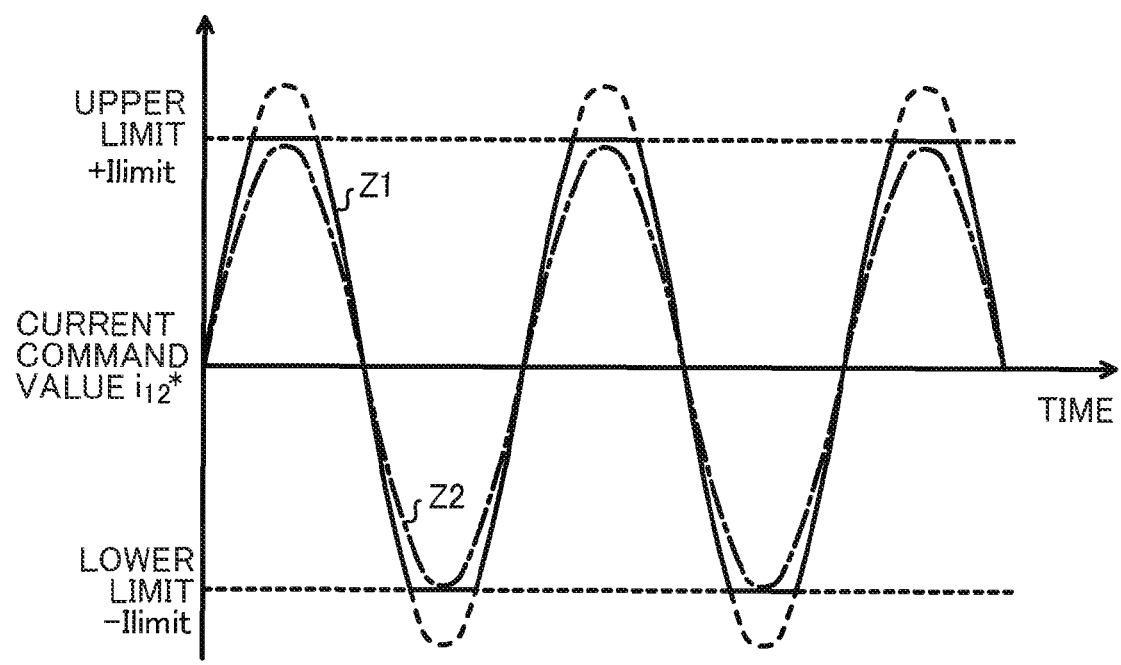
FIG. 22 is a diagram illustrating a current command value.
Figure 23:
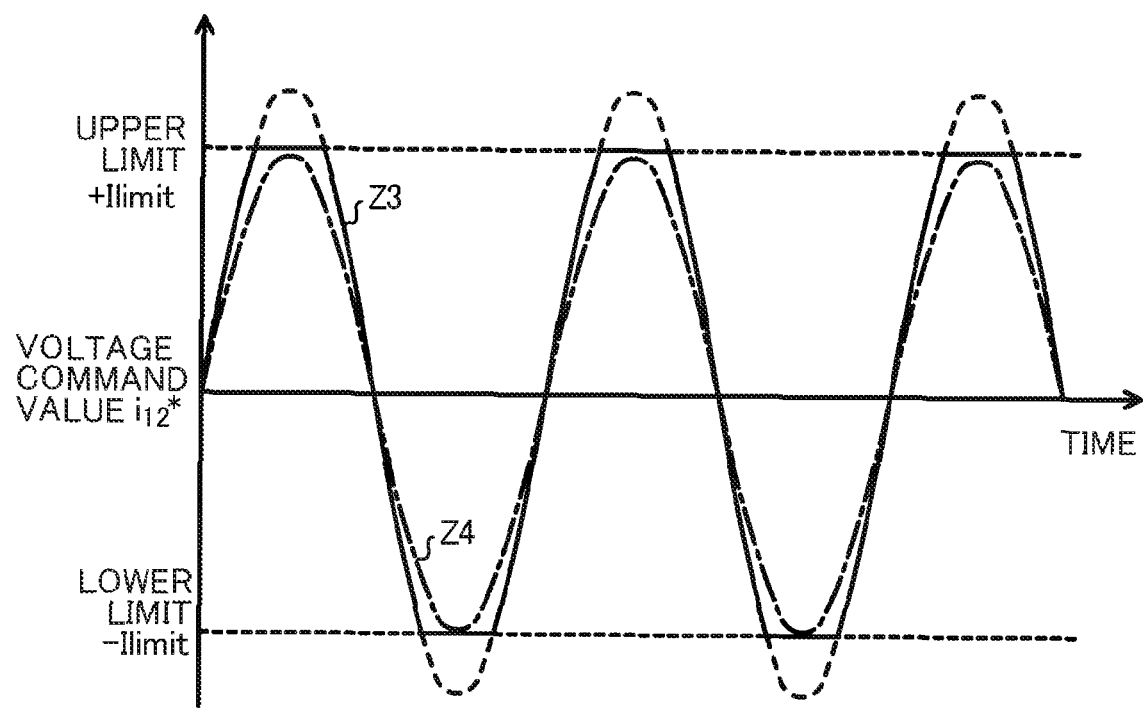
FIG. 23 is a diagram illustrating a voltage command value.

An operation of a resonance suppression device according to the sixth embodiment of the present invention will hereinafter be described with reference to FIGS. 20, 22 and 23. FIG. 22 is a diagram illustrating a current command value. Note that dot-and-dash line Z2 represents the current command value $i_{12}{}^*$ of the resonance suppression device 4b, and the solid line Z1 represents a current command value of another resonance suppression device. FIG. 23 is a diagram illustrating a voltage command value. Note that dot-and-dash line Z4 represents the voltage command value $V_{12}{}^*$ of the resonance suppression device 4b, and the solid line Z3 represents a voltage command value of another resonance suppression device. Another resonance suppression device in FIGS. 22 and 23 corresponds to a device that is not provided with the gain correction coefficient calculation unit 51 in the resonance suppression device 4b.

The highpass filter 400 extracts a harmonic voltage $V_h$ of the connection point voltage V. The coefficient control unit 5a sets the result of multiplying the gain correction coefficient $K_a$ by the gain $K_0$ as the gain K of the transfer function 410a. The current command value generation unit 40a outputs the current command value $i_{11}{}^*$. Since the gain K is adjusted by the gain correction coefficient calculation unit 51, the current limiter 41 outputs the current command value $i_{12}{}^*$ having the same value as the current command value $i_{11}{}^*$. The addition unit 45 outputs a difference between a value of the compensation current i and the current command value $i_{12}{}^*$. The current control unit 46 outputs the voltage command value $V_{11}{}^*$ based on the output value of the addition unit 45. Since the gain K is adjusted by the gain correction coefficient calculation unit 51, the voltage limiter 42 outputs the voltage command value $V_{12}{}^*$ having the same value as the voltage command value $V_{11}{}^*$. Then, the parallel inverter 47 outputs the compensation current i.

=Other Resonance Suppression Devices and Resonance Suppression Device 4b=

In other resonance suppression devices, since the gain K is a fixed value, command values may be limited in the current limiter 41 and the voltage limiter 42. Thus, waveforms of a current command value and a voltage command value in other resonance suppression devices may result in, for example, the solid line Z1 in FIG. 22 and the dot-and-dash line Z3 in FIG. 23, respectively. Therefore, in other resonance suppression devices, the compensation current i itself may cause a harmonic, and a harmonic component in the connection point voltage V may not be eliminated.

Whereas, in the resonance suppression device 4b according to the present embodiment, since the gain K is adjusted by the gain correction coefficient calculation unit 51, command values are not limited in the current limiter 41 and the voltage limiter 42, as described above. Thus, waveforms of the current command value $i_{12}^*$ and the voltage command value $V_{12}^*$ result in, for example, the dot-and-dash line Z2 in FIG. 22 and the dot-and-dash line Z4 in FIG. 23, respectively. Therefore, in the resonance suppression device 4b, it is prevented that the compensation current i itself causes a harmonic, thereby being able to reliably eliminate a harmonic component in the connection point voltage V.

Seventh Embodiment

===Configuration of Resonance Suppression Device===

Figure 24:
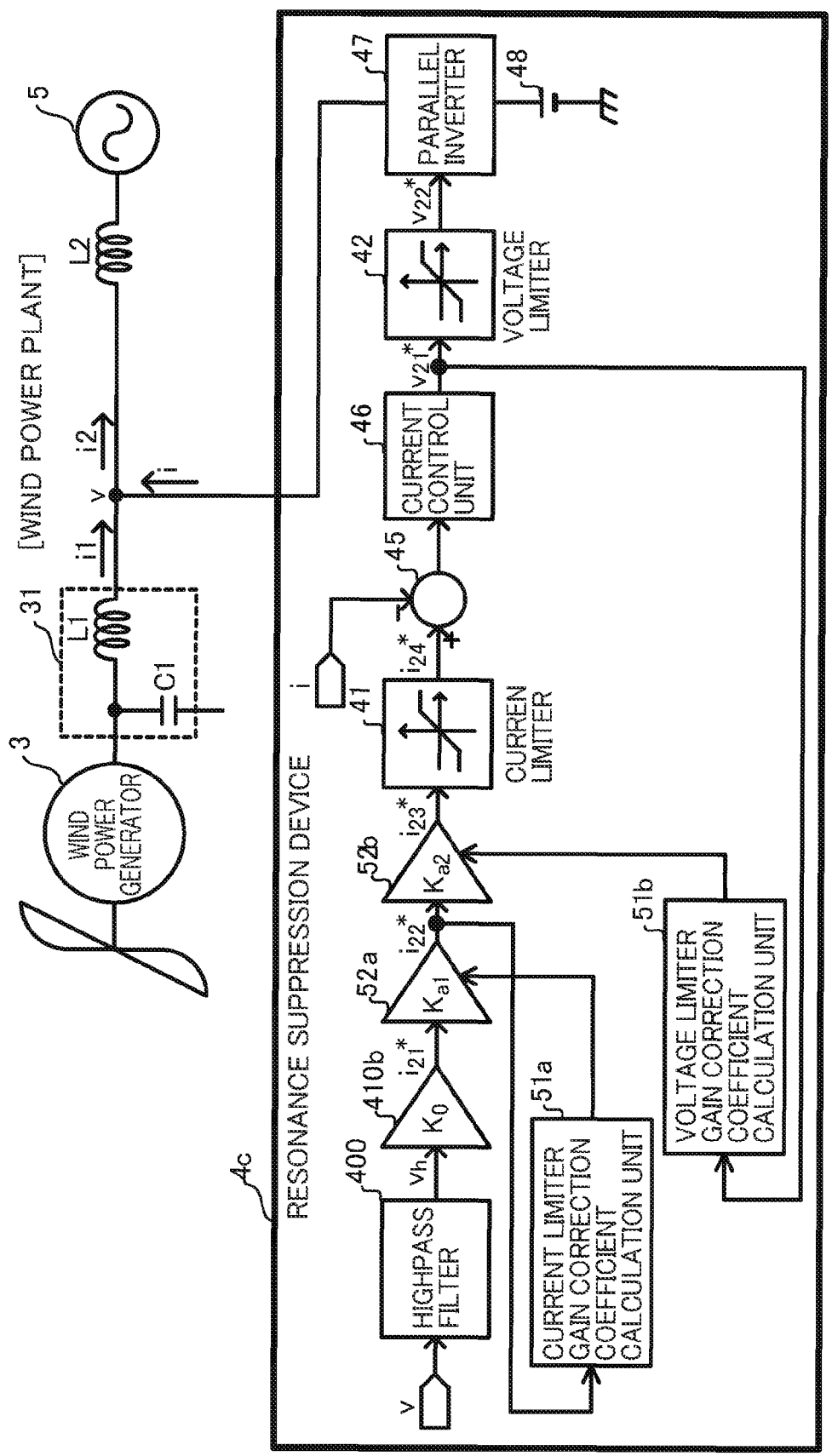
FIG. 24 is a block diagram illustrating a configuration of a resonance suppression device according to seventh embodiment of the present invention.
Figure 25:
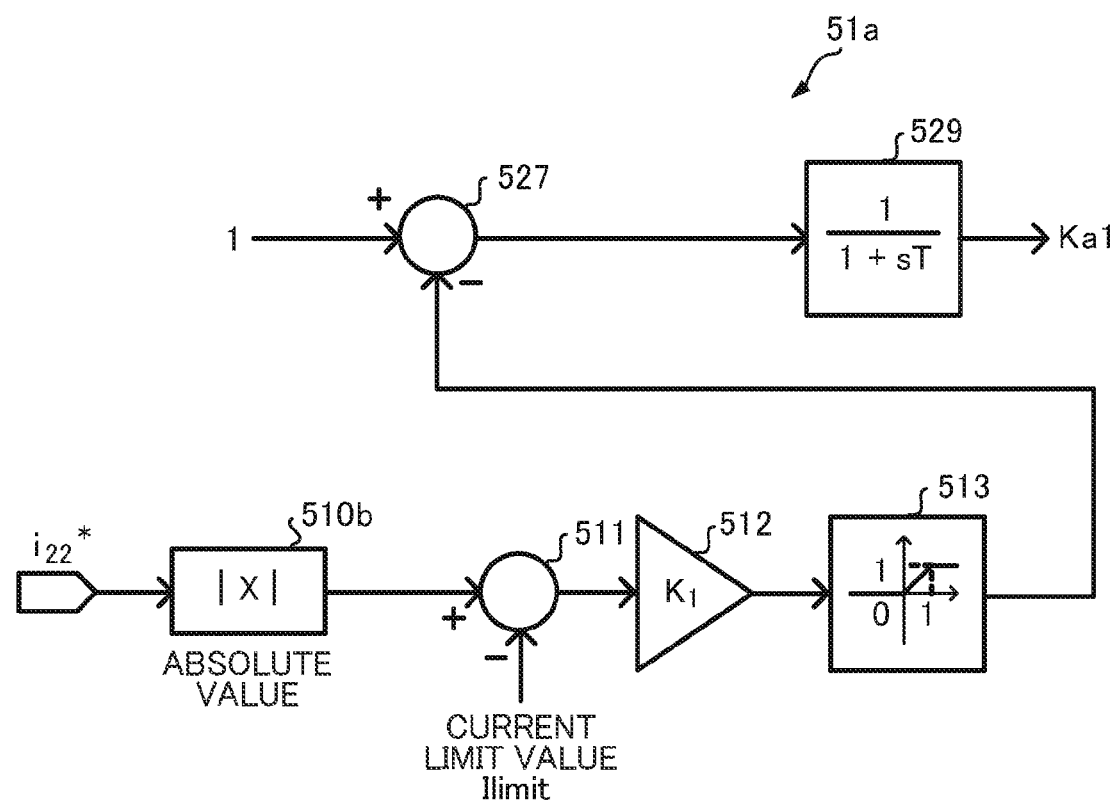
FIG. 25 is a block diagram illustrating a configuration of a current limiter gain correction coefficient calculation unit according to a seventh embodiment of the present invention.
Figure 26:
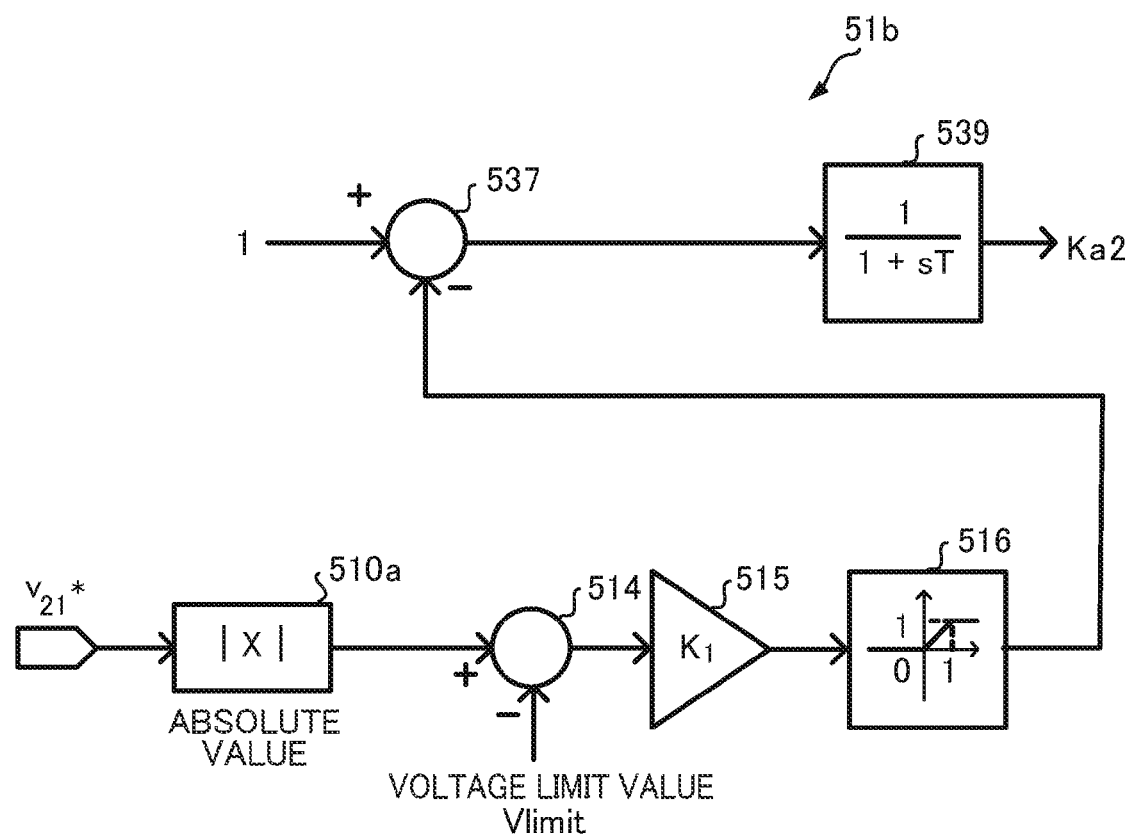
FIG. 26 is a block diagram illustrating a configuration of a voltage limiter gain correction coefficient calculation unit according to a seventh embodiment of the present invention.

A configuration of a resonance suppression device according to a seventh embodiment of the present invention will hereinafter be described with reference to FIGS. 24 to 26. FIG. 24 is a block diagram illustrating the resonance suppression device according to the present embodiment. Note that components in FIG. 24 similar to those in FIG. 20 are designated as the same reference numerals and descriptions thereof will be omitted. FIG. 25 is a block diagram illustrating a configuration of a current limiter gain correction coefficient calculation unit according to the present embodiment. FIG. 26 is a block diagram illustrating a voltage limiter gain correction coefficient calculation unit according to the present embodiment. Note that components in FIGS. 25 and 26 similar to those in FIG. 21 are designated as the same reference numerals and descriptions thereof will be omitted.

A resonance suppression device 4c includes the gain $K_0$ which is a fixed value as a transfer function 410b, a first correction unit 52a, a second correction unit 52b, a current limiter gain correction coefficient calculation unit 51a, and a voltage limiter gain correction coefficient calculation unit 51b.

In the first correction unit 52a, a calculation result of the current limiter gain correction coefficient calculation unit 51a is set as a first correction coefficient $k_{a1}$. The first correction unit 52a multiplies a current command value $i_{21}^*$, serving as the output value of the transfer function 410b, by the first correction coefficient $k_{a1}$, and outputs the multiplication result thereof as a current command value $i_{22}^*$.

The calculation result of the voltage limiter gain correction coefficient calculation unit 51b is set to the second correction unit 52b, as a second correction coefficient $k_{a2}$. The second correction unit 52b multiplies the current command value $i_{22}^*$, serving as the output value of the first correction unit 52a, by the second correction coefficient $k_{a2}$, to output the multiplication result as a current command value $i_{23}^*$.

The current command value $i_{22}^*$ is inputted to the current limiter gain correction coefficient calculation unit 51a (FIG. 25), and the first correction coefficient $k_{a1}$ is outputted therefrom. The current limiter gain correction coefficient calculation unit 51a includes an addition unit 527 and a lag element 529.

An output value of the excess limiter 513 and 1 serving as an initial value are inputted to the addition unit 527, and a value obtained by subtracting, from 1, an output value of the excess limiter 513 is outputted therefrom.

An output value of the addition unit 527 is inputted to the lag element 529 and, for example, a first order lag is added to the output value of the addition unit 527 which is inputted thereto, and the first correction coefficient $k_{a1}$ is outputted therefrom. That is, the lag element 529 exerts a function similar to that of the lag element 519 (FIG. 21).

A voltage command value $V_{21}^*$ is inputted to the voltage limiter gain correction coefficient calculation unit 51b (FIG. 26), and the second correction coefficient $k_{a2}$ is outputted therefrom. The voltage limiter gain correction coefficient calculation unit 51b includes an addition unit 537 and a lag element 539.

An output value of the excess limiter 516 and 1 serving as an initial value are inputted to the addition unit 537, and a value obtained by subtracting, from 1, an output value of the excess limiter 516 is outputted therefrom.

An output value of the addition unit 537 is inputted to the lag element 539 and, for example, a first order lag is added to the output value of the addition unit 537 which is inputted thereto, and the second correction coefficient $k_{a2}$ is outputted therefrom. That is, the lag element 539 exerts a function similar to that of the lag element 519 (FIG. 21).

===Operation of Resonance Suppression Device===

An operation of a resonance suppression device according to the seventh embodiment of the present invention will hereinafter be described with reference to FIG. 24.

The highpass filter 400 extracts the harmonic voltage $V_h$ in the connection point voltage V. The harmonic voltage $V_h$ is inputted to the transfer function 410b, and the current command value $i_{22}^*$ is outputted therefrom. The current command value $i_{21}^*$ is inputted to the first correction unit 52a, and the current command value $i_{21}^*$ is outputted therefrom. The current command value $i_{22}^*$ is inputted to the second correction unit 52b, and the current command value $i_{23}^*$ is outputted therefrom. Since correction is performed in the first correction unit 52a, the current limiter 41 outputs a current command value $i_{24}^*$ having the same value as the current command value $i_{23}^*$. The addition unit outputs a difference between a value of the compensation current i and the current command value $i_{24}^*$. The current control unit 46 outputs the voltage command value $V_{21}^*$ based on the output value of the addition unit 45. Since correction is performed in the second correction unit 52b, the voltage limiter 42 outputs a voltage command value $V_{22}^*$ having the same value as the voltage command value $V_{21}^*$. Then, the parallel inverter 47 outputs the compensation current i.

Eighth Embodiment

===Resonance Suppression Device===

Figure 27:
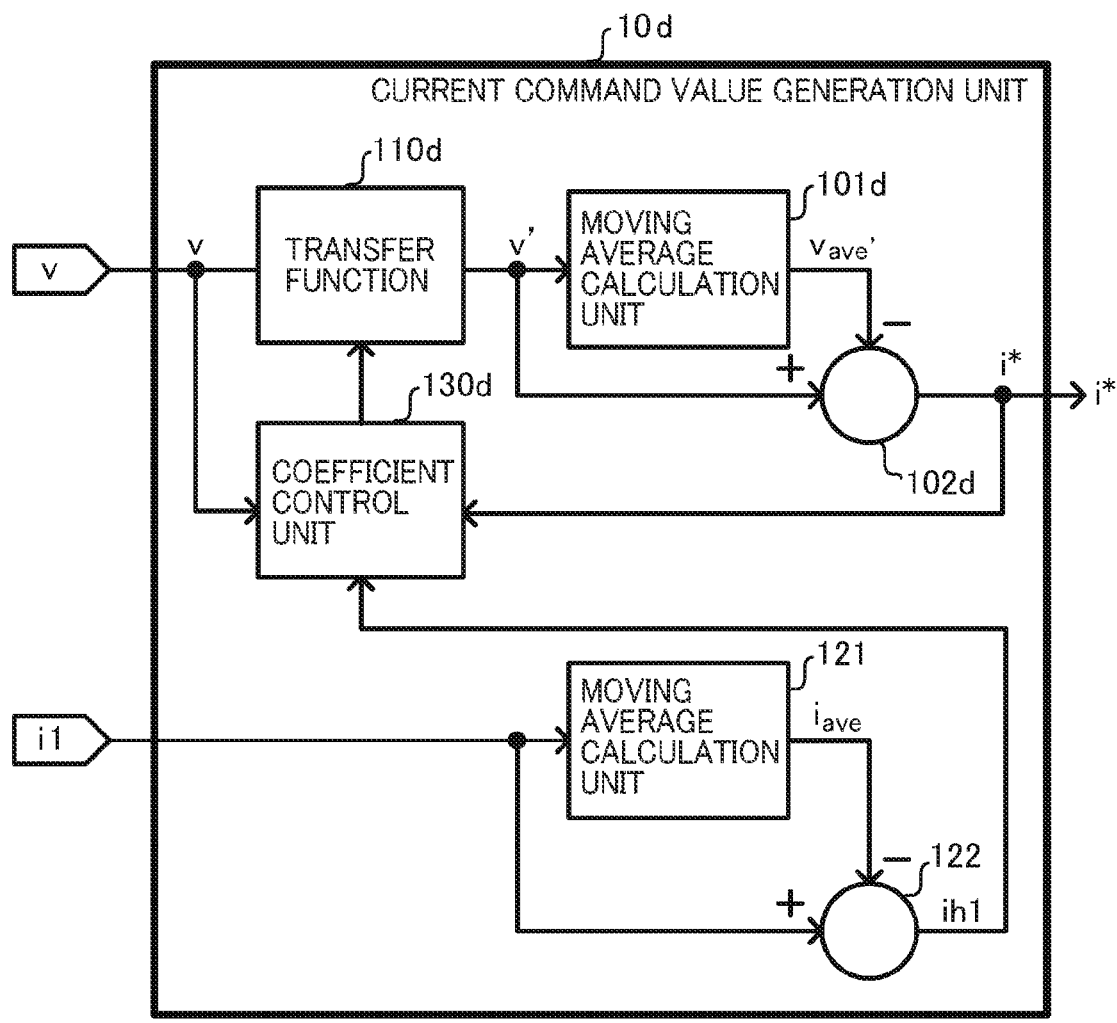
FIG. 27 is a block diagram illustrating a current command value generation unit according to the eighth embodiment of the present invention.
Figure 28:
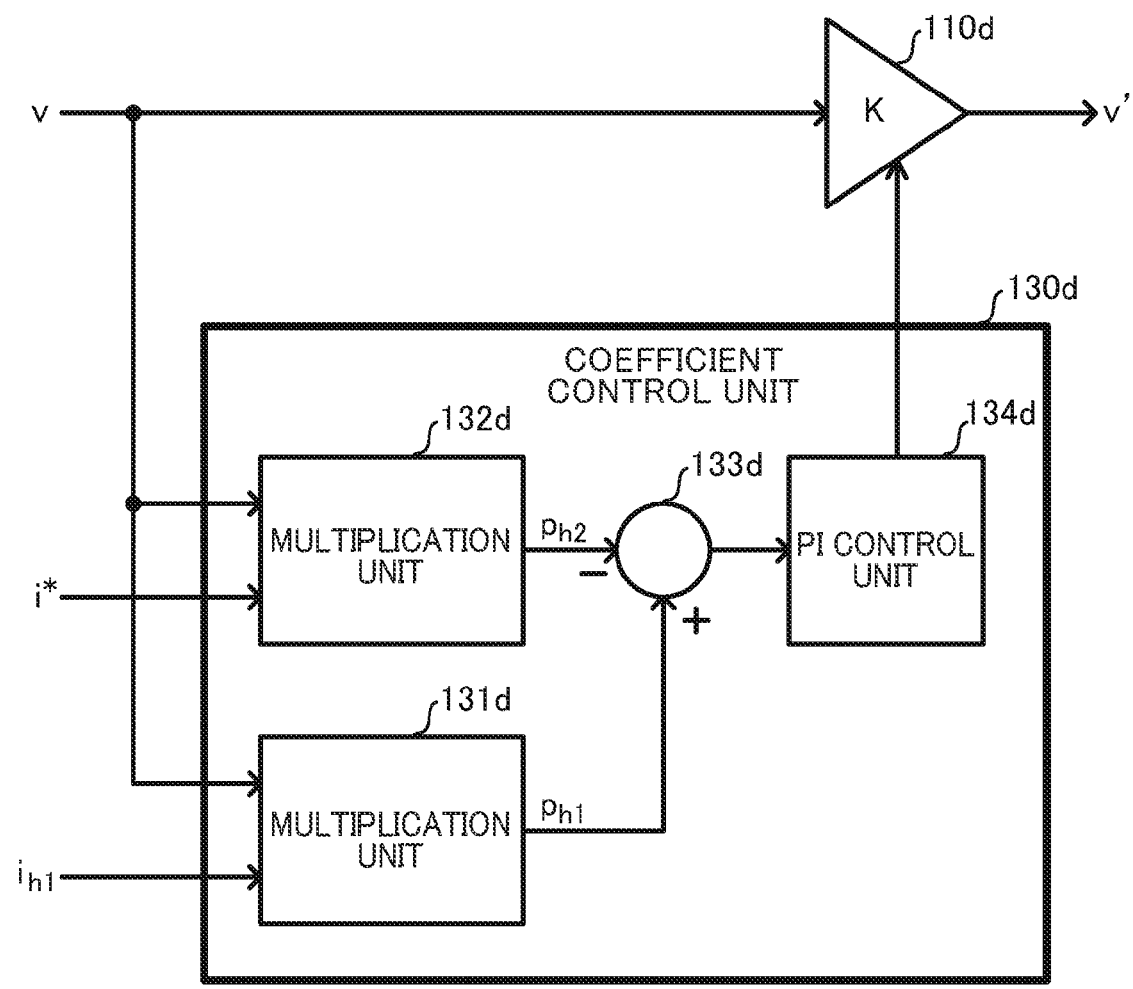
FIG. 28 is a block diagram illustrating a coefficient control unit according to the eighth embodiment of the present invention.

A resonance suppression device according to an eighth embodiment of the present invention will hereinafter be described with reference to FIGS. 1, 27 and 28. FIG. 27 illustrates a configuration of a current command value generation unit 10d according to the present embodiment. Note that components similar to the components in FIG. 2A are designated as the same reference numerals and descriptions thereof will be omitted. FIG. 28 illustrates a configuration of a coefficient control unit 130d according to the present embodiment.

A resonance suppression device 1d (FIG. 1) according to the present embodiment includes the current command value generation unit 10d in place of the current command value generation unit 10a in the resonance suppression device 1a according to the first embodiment. The current command value generation unit 10d is configured such that the high-pass filter 100 and a transfer function 110d are exchanged in arrangement with each other in the current command value generation unit 10a.

The current command value generation unit 10d includes: a moving average calculation unit 101d; the moving average calculation unit 121; an addition unit 102d; the addition unit 122; the transfer function 110d; and the coefficient control unit 130d.

The connection point voltage V is inputted to the transfer function 110d, and a result obtained by multiplying the connection point voltage V by the transfer function 110 is outputted as an output value V'.

The output value V' is inputted to the moving average calculation unit 101d, and an output value $V_{aVe}'$ corresponding to a fundamental wave component of the output value V' is outputted therefrom. Further, the output value V' and the output value $V_{aVe}'$ are inputted to the addition unit 102d. A difference between the output value V' and the output value $V_{aVe}'$ is outputted from the addition unit 102d as the current command value i*.

The coefficient control unit 130d (FIG. 28) includes: multiplication units 131d, 132d; an addition unit 133d; and a PI control unit 134d. Note that configurations of the addition unit 133d and the PI control unit 134d are similar to the configurations of the addition unit 133 (FIG. 3) and the PI control unit 134 according to the first embodiment.

The connection point voltage V and the harmonic current $i_{h1}$ are inputted to the multiplication unit 131d. The product $p_{h1}$ thereof is outputted from the multiplication unit 131d. Further, the connection point voltage V and the current command value i* are inputted to the multiplication unit 132d. The product $p_{h2}$ thereof is outputted from the multiplication unit 132d. The PI control unit 134d controls a coefficient of the transfer function 110d based on the inputs from the addition unit 133d corresponding to these outputs.

As described above, in the resonance suppression device 1c, the voltage V of the power system 5 is inputted to the current command value generation unit 10a (or 10b), and the current command value i* obtained by multiplying the harmonic component (harmonic voltage $V_h$) thereof by a transfer function is outputted to the power conversion device 7 that is connected to the power system 5. Thus, the compensation current i is supplied from the power conversion device 7 to the power system 5, thereby being able to suppress harmonic distortion caused by the harmonic voltage $V_h$. At this time, since only a harmonic component contained in the voltage V is suppressed, the compensation current i can be reduced.

Further, as described above, in the resonance suppression device 1b, the connection point voltage V between the wind power generator 3 and the power system 5 is inputted to the current command value generation unit 10b, and the compensation current i, which follows the current command value i* produced by multiplying the harmonic component (harmonic voltage $V_h$) of the inputted voltage by a transfer function, is outputted from the parallel inverter 17, and an output thereof is supplied to the power system 5 in a manner parallel with the wind power generator 3. This reduces the compensation current i in the case of reducing harmonic distortion which is caused by the harmonic voltage $V_h$, thereby being able to reduce the capacity of the parallel inverter 17.

Further, in the resonance suppression device 1a, the output current i1 of the wind power generator 3 is further inputted to the current command value generation unit 10a, and the gain K is controlled based on the harmonic component (harmonic current $i_{h1}$) of the inputted current, and thus, even if a resonance point changes, resonance can be reduced using the appropriate gain K corresponding thereto.

Further, in the resonance suppression device 2, the compensation currents ia, ib, ic, which respectively follow the current command values ia*, ib*, ic* obtained such that the three-phase connection point voltages Va, Vb, Vc are dq transformed, then to extract harmonic components (harmonic voltages $Vd_h$, $Vq_h$) of a d-axis component and a q-axis component, and the extracted components are multiplied by transfer functions and inverse dq transformation is performed for the multiplied resultants, are outputted from the three-phase parallel inverter 27. Thus, in the three-phase power system, only harmonic components contained in the connection point voltage V are reduced, to improve the waveform of the connection point voltage V with the small compensation current i. Further, when harmonic components are not contained in the connection point voltage V, the output of the compensation current i can be stopped.

Further, the coefficient control unit 130b is configured as such a state estimator as to match the current command value i* with the harmonic current $i_{h1}$, thereby reducing only harmonic components contained in the connection point voltage V, to improve the waveform of the connection point voltage V with the small compensation current i.

Further, the product of the current command value i* and the harmonic voltage $V_h$, and the product of the harmonic current $i_{h1}$ and the harmonic voltage $V_h$ are obtained, and the coefficient control unit 130a is configured as such a state estimator as to match these products with each other, thereby being able to reduce only a harmonic component contained in the connection point voltage V and harmonic current corresponding thereto.

Further, the coefficient control unit 130c (FIG. 19) includes the dead band 135. Thus, it is prevented that the value of the gain K serving as the transfer function 110 increases to the excessive value of the compensation current i, due to the output value ($p_{h1}$−$p_{h2}$) of the addition unit 133 not being 0. Therefore, harmonic distortion contained in the voltage V can reliably be reduced.

Further, the gain K of the resonance suppression device 1b (FIG. 7) is a fixed value. And, this fixed value is determined according to, for example, the number of the operating wind power generators 3. Thus, the value of the gain K is determined according to the number of the wind power generators 3 in operation, and therefore resonance can reliably be reduced.

Further, in the coefficient control unit 5a (FIG. 20), the value of the gain K is corrected (controlled) so that the current command value $i_{11}$* and the voltage command value $V_{11}$* are in predetermined ranges of the current limiter 41 and the voltage limiter 42. Thus, distortion of the compensation current i, which is caused by the command values being limited by the current limiter 41 and the voltage limiter 42, can be prevented, for example. Therefore, it can be prevented that the compensation current i itself causes a harmonic, thereby being able to reliably reduce resonance.

Note that the above embodiments are simply for facilitating the understanding of the present invention and are not in any way to be construed as limiting the present invention. The present invention may variously be changed or altered without departing from its spirit and encompass equivalents thereof.

In the above embodiments, resonance is to be reduced, which occurs when the harmonic filter 31 of the wind power generator 3 is connected to the power system 5, but it is not limited thereto. The resonance suppression devices according to the above embodiments may be applied to other power facilities including capacitance and inductance, which may cause resonance, such as a harmonic filter, a reactor, or the like. For example, other power facilities represent a capacitor, a filter, a cable, and the like, in terms of components; and also represent other power generation facilities of photovoltaic power generation, geothermal power generation, wave-power generation, and the like, in terms of systems.

Further, in the second embodiment, for example, the transfer function 110 (FIG. 7) may be provided upstream of the highpass filter 100.

Further, in the fourth embodiment, for example, the transfer functions 211, 212 (FIG. 12) may be respectively provided between the dq transformation unit 201 and the highpass filter 202 and between the dq transformation unit 201 and the highpass filter 203. In this case, the d-axis voltage Vd and the q-axis voltage Vq, as the outputs of the dq transformation unit 201, are multiplied by the transfer functions 211, 212, respectively. Further, for example, transfer functions, which have a configuration similar to that of the transfer functions 211, 212 and correspond to respectively phases, may be provided upstream of the dq transformation unit 201. In this case, the connection point voltages Va, Vb, Vc of respective phases are respectively multiplied by transfer functions of respective phases. Further, for example, transfer functions, which have a configuration similar to that of the transfer functions 211, 212 and correspond to respective phases, may be provided downstream of the inverse dq transformation unit 213. In this case, the output values corresponding to respective phases from the inverse dq transformation unit 213 are respectively multiplied by transfer functions of respective phases.

Further, in the sixth embodiment, for example, the transfer function 410a (FIG. 20) may be provided upstream of the highpass filter 400. In this case, the connection point voltage V multiplied by the transfer function 410a is inputted to the highpass filter 400, and the output value of the highpass filter 400 results in the current command value $i_{11}$*.

Further, for example, band elimination filters may be used in place of the highpass filter 100, 120, 202, 203, 222, 223, 400 (also referred to as "highpass filters"). In this case, for example, it is possible to eliminate a fundamental wave component, to extract a harmonic component and a subharmonic component in the signal contained in the inputted signals and output the resultant. Then, a compensation current for eliminating a harmonic component or a subharmonic component in the connection point voltage V is outputted, based on the output of a band elimination filter, thereby being able to reduce resonance. Further, for example, band-pass filters may be used in place of the highpass filters. In this case, with the adjustment of a pass band, a fundamental wave component can be eliminated to extract a harmonic component or a subharmonic component in the signal in the inputted signals and output the resultant. Then, a compensation current for eliminating a harmonic component or a subharmonic component in the connection point voltage V is outputted, based on the output of the band-pass filter, thereby being able to reduce resonance. Note that, a subharmonic (subharmonics) indicate a wave having a frequency lower than the frequency of a fundamental wave in a wave having a predetermined frequency component.

Figure 4:
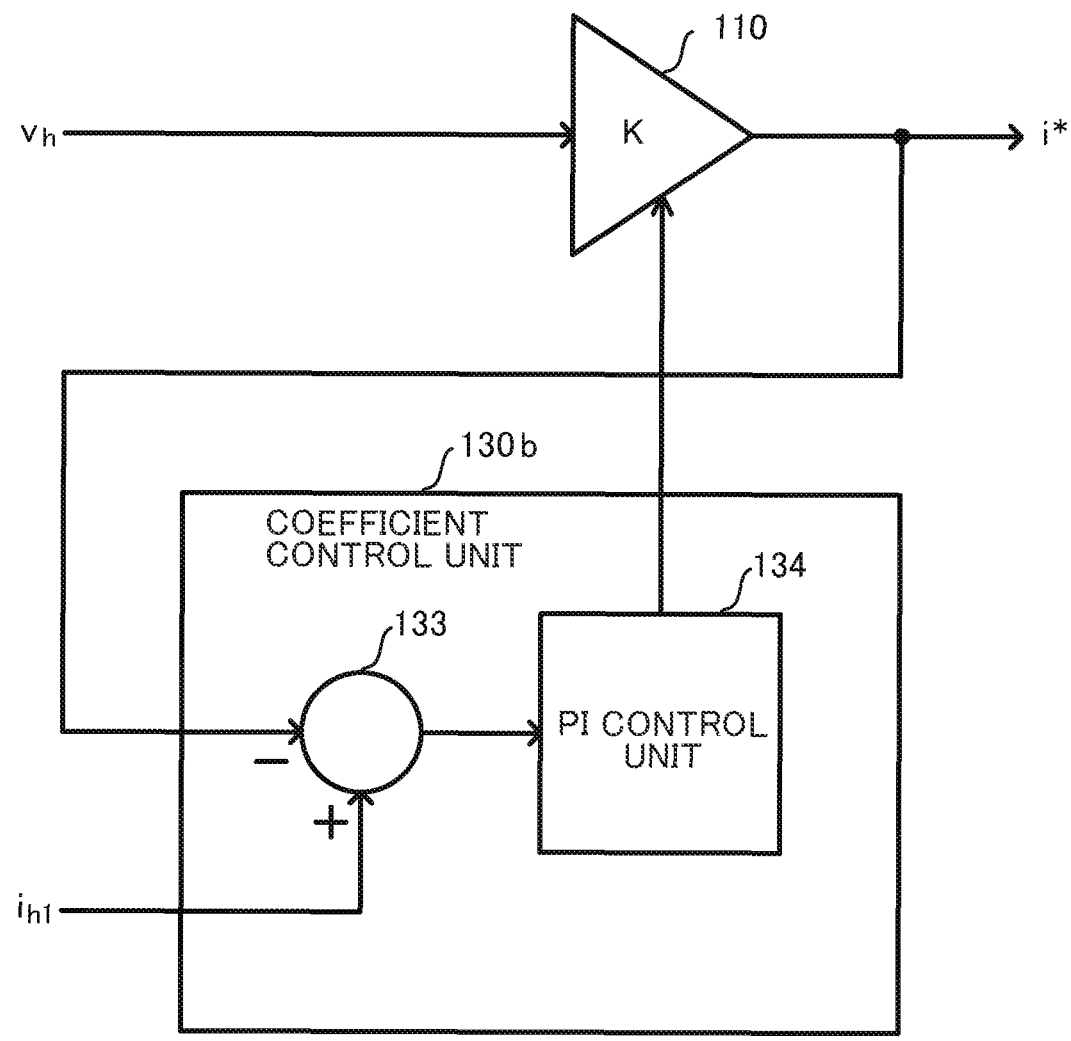
FIG. 4 is a block diagram illustrating another configuration example of a coefficient control unit.

Further, for example, the dead band 135 (FIG. 19) may be provided between the addition unit 133 and the PI control unit 134 in the coefficient control unit 130b (FIG. 4).

Further, in the seventh embodiment, only either one of the first correction unit 52a (FIG. 24) and the second correction unit 52b may be provided.

Further, with a combination of the fourth and the sixth embodiments, the current command value generation unit 40a may be applied with respect to the resonance suppression device 2 (FIG. 11). Further, with a combination of the fourth and the seventh embodiments, the current limiter gain correction coefficient calculation unit 51a, the voltage limiter gain correction coefficient calculation unit 51b, the first correction unit 52a, and the second correction unit 52b may be applied with respect to the resonance suppression device 2.

What is claimed is:

1. A resonance suppression device configured to supply compensation current to a power system from a power conversion device connected to the power system, to suppress resonance which occurs with a power facility being connected to the power system, the resonance suppression device comprising:
   a transfer function that is to be multiplied to a value based on voltage of the power system;
   a filter configured to extract a frequency component obtained by eliminating a fundamental wave component from frequency components contained in the inputted voltage, to output the resultant; and
   a coefficient control unit configured to control a coefficient of the transfer function so that a value of the compensation current falls within a predetermined range, according to output capacity of the power conversion device,
   wherein including a current command value generation unit being configured to generate as a current command value with respect to the power conversion device an output value obtained by inputting in the filter a value obtained by multiplying the transfer function to voltage of the power system or a value obtained by multiplying the transfer function to an output value obtained by inputting in the filter voltage of the power system,
   wherein the current command value generation unit outputs the current command value to the power conversion device, to supply the compensation current to the power system.

2. The resonance suppression device according to claim 1, wherein
   further includes a current control unit that generates a voltage command value to the power conversion device from the current command value, and
   the coefficient control unit controls the coefficient, to make a value of the compensation current based on the voltage command value fall within the predetermined range.

3. The resonance suppression device according to any one of claim 1 or 2, wherein
   the coefficient control unit calculates a current command value deviation amount that is an amount of deviation of the current command value from a current command value range to be the predetermined range of a value of the compensation current and a voltage command value deviation amount that is an amount of deviation of the voltage command value from a voltage command value range to be the predetermined range of a value of the compensation current, and controls a coefficient of the transfer function based on the current command value deviation amount and the voltage command value deviation amount.

4. The resonance suppression device according to claim 3, wherein
the coefficient control unit controls the coefficient of the transfer function based on a sum of the current command value deviation amount and the voltage command value deviation amount.

5. The resonance suppression device according to any one of claim 2 or 3, wherein
the coefficient control unit calculates a current limiter gain correction coefficient based on the current command value deviation amount, calculates a voltage limiter gain correction coefficient based on the voltage command value deviation amount, and controls the coefficient of the transfer function using a value obtained by multiplying the current limiter gain correction coefficient and the voltage limiter gain correction coefficient.

6. The resonance suppression device according to claim 1, the resonance suppression device comprising:
an inverter connected in parallel with the power facility to the power system, the inverter functioning as the power conversion device.

* * * * *